(12) United States Patent
Markoski et al.

(10) Patent No.: US 7,901,817 B2
(45) Date of Patent: Mar. 8, 2011

(54) SYSTEM FOR FLEXIBLE IN SITU CONTROL OF WATER IN FUEL CELLS

(75) Inventors: Larry J. Markoski, Raleigh, NC (US); Dilip Natarajan, Cary, NC (US); Alex Primak, Cary, NC (US)

(73) Assignee: INI Power Systems, Inc., Cary, NC (US)

( * ) Notice: Subject to any disclaimer, the term of this patent is extended or adjusted under 35 U.S.C. 154(b) by 1242 days.

(21) Appl. No.: 11/354,259

(22) Filed: Feb. 14, 2006

(65) Prior Publication Data
US 2007/0190393 A1    Aug. 16, 2007

(51) Int. Cl.
*H01M 8/02* (2006.01)
*H01M 4/94* (2006.01)

(52) U.S. Cl. ............. 429/414; 429/408; 429/428

(58) Field of Classification Search .......... 429/34, 429/414
See application file for complete search history.

(56) References Cited

U.S. PATENT DOCUMENTS

| | | |
|---|---|---|
| 3,849,275 A | 11/1974 | Candor |
| 3,902,916 A | 9/1975 | Warszawski |
| 3,992,223 A | 11/1976 | Gutbier |
| 4,066,526 A | 1/1978 | Yeh |
| 4,311,594 A | 1/1982 | Peny |
| 4,652,504 A | 3/1987 | Ando |
| 4,722,773 A | 2/1988 | Plowman et al. |
| 4,732,823 A | 3/1988 | Ito et al. |
| 4,783,381 A | 11/1988 | Tytgat et al. |
| 5,185,218 A | 2/1993 | Brokman et al. |
| 5,290,414 A | 3/1994 | Marple |
| 5,316,629 A | 5/1994 | Clifford et al. |
| 5,413,881 A | 5/1995 | Licht et al. |
| 5,534,120 A | 7/1996 | Ando et al. |
| 5,648,183 A | 7/1997 | Licht et al. |
| 5,858,567 A | 1/1999 | Spear, Jr. et al. |
| 5,863,671 A | 1/1999 | Spear, Jr. et al. |
| 5,952,118 A | 9/1999 | Ledjeff et al. |
| 6,007,931 A | 12/1999 | Fuller et al. |
| 6,013,385 A | 1/2000 | DuBose |
| 6,039,853 A * | 3/2000 | Gestermann et al. ........ 204/258 |
| 6,054,427 A | 4/2000 | Winslow |
| 6,110,613 A | 8/2000 | Fuller |

(Continued)

FOREIGN PATENT DOCUMENTS

EP    0 252 559    6/1991

(Continued)

OTHER PUBLICATIONS

Chen et al., "Ion exchange resin/polystyrene sulfonate composite membranes for PEM fuel cells", Journal of Membrane Science, 243, pp. 327-333, 2004.

(Continued)

*Primary Examiner* — Patrick Ryan
*Assistant Examiner* — Brent Thomas
(74) *Attorney, Agent, or Firm* — Evan Law Group LLC

(57) ABSTRACT

An electrochemical cell includes an anode, a cathode including a gas diffusion electrode and having first and second surfaces, an inlet for gaseous oxidant that is in contact with the first surface of the cathode, and a liquid electrolyte. Water generated at the cathode may be transported by osmosis into the liquid electrolyte. The fuel cell may produce a current density of 200 mA/cm$^2$ without cathode flooding.

20 Claims, 9 Drawing Sheets

U.S. PATENT DOCUMENTS

| | | | |
|---|---|---|---|
| 6,136,272 A | 10/2000 | Weigl et al. | |
| 6,242,123 B1 | 6/2001 | Nezu et al. | |
| 6,312,846 B1 | 11/2001 | Marsh et al. | |
| 6,432,918 B1 | 8/2002 | Winslow | |
| 6,437,011 B2 | 8/2002 | Steck et al. | |
| 6,447,943 B1 | 9/2002 | Peled et al. | |
| 6,472,091 B1 | 10/2002 | Konrad et al. | |
| 6,492,047 B1 | 12/2002 | Peled et al. | |
| 6,607,655 B1 | 8/2003 | Lowe et al. | |
| 6,638,654 B2 | 10/2003 | Jankowksi et al. | |
| 6,641,948 B1 | 11/2003 | Ohlsen et al. | |
| 6,713,206 B2* | 3/2004 | Markoski et al. | 429/38 |
| 6,715,899 B1 | 4/2004 | Wu | |
| 6,716,548 B1* | 4/2004 | Kaliaguine et al. | 429/33 |
| 6,720,105 B2 | 4/2004 | Ohlsen et al. | |
| 6,727,016 B2 | 4/2004 | Bostaph et al. | |
| 6,808,840 B2 | 10/2004 | Mallari et al. | |
| 6,811,916 B2 | 11/2004 | Mallari et al. | |
| 6,852,443 B1 | 2/2005 | Ohlsen | |
| 6,890,680 B2 | 5/2005 | Beckmann et al. | |
| 6,893,763 B2 | 5/2005 | Fan et al. | |
| 6,911,411 B2 | 6/2005 | Cox et al. | |
| 6,924,058 B2 | 8/2005 | Ohlsen et al. | |
| 6,960,285 B2 | 11/2005 | Schoeniger et al. | |
| 7,014,944 B2 | 3/2006 | Kordesch et al. | |
| 7,205,064 B2 | 4/2007 | Markoski et al. | |
| 7,252,898 B2* | 8/2007 | Markoski et al. | 429/12 |
| 2002/0015868 A1 | 2/2002 | Surampudi et al. | |
| 2002/0028372 A1 | 3/2002 | Ohlsen et al. | |
| 2002/0031695 A1 | 3/2002 | Smotkin | |
| 2002/0041991 A1 | 4/2002 | Chan et al. | |
| 2002/0091225 A1 | 7/2002 | McGrath et al. | |
| 2002/0127454 A1 | 9/2002 | Narang et al. | |
| 2003/0003336 A1 | 1/2003 | Colbow et al. | |
| 2003/0003348 A1* | 1/2003 | Hanket | 429/44 |
| 2003/0091883 A1 | 5/2003 | Peled et al. | |
| 2003/0096151 A1 | 5/2003 | Blunk et al. | |
| 2003/0134163 A1 | 7/2003 | Markoski et al. | |
| 2003/0148159 A1 | 8/2003 | Cox et al. | |
| 2003/0170524 A1* | 9/2003 | Kordesch et al. | 429/34 |
| 2003/0175581 A1 | 9/2003 | Kordesch et al. | |
| 2003/0194598 A1 | 10/2003 | Chan | |
| 2003/0198852 A1 | 10/2003 | Masel et al. | |
| 2003/0219640 A1 | 11/2003 | Nam et al. | |
| 2003/0231004 A1 | 12/2003 | Takahashi et al. | |
| 2004/0039148 A1 | 2/2004 | Cao et al. | |
| 2004/0045816 A1 | 3/2004 | Masel et al. | |
| 2004/0058217 A1* | 3/2004 | Ohlsen et al. | 429/34 |
| 2004/0072047 A1 | 4/2004 | Markoski et al. | |
| 2004/0096721 A1 | 5/2004 | Ohlsen et al. | |
| 2004/0101740 A1 | 5/2004 | Sanders | |
| 2004/0115518 A1 | 6/2004 | Masel et al. | |
| 2004/0121208 A1 | 6/2004 | James et al. | |
| 2004/0126666 A1 | 7/2004 | Cao et al. | |
| 2004/0151965 A1 | 8/2004 | Forte et al. | |
| 2004/0209153 A1 | 10/2004 | Peled et al. | |
| 2004/0209154 A1 | 10/2004 | Ren et al. | |
| 2004/0265681 A1 | 12/2004 | Markoski et al. | |
| 2005/0003263 A1 | 1/2005 | Mallari et al. | |
| 2005/0008923 A1 | 1/2005 | Malhotra | |
| 2005/0074657 A1 | 4/2005 | Rusta-Sallehy et al. | |
| 2005/0084737 A1 | 4/2005 | Wine et al. | |
| 2005/0084738 A1 | 4/2005 | Ohlsen et al. | |
| 2005/0089748 A1 | 4/2005 | Ohlsen et al. | |
| 2005/0136309 A1 | 6/2005 | Masel et al. | |
| 2005/0161342 A1 | 7/2005 | Carson et al. | |
| 2005/0191541 A1 | 9/2005 | Gurau et al. | |
| 2005/0202305 A1 | 9/2005 | Markoski et al. | |
| 2005/0252784 A1 | 11/2005 | Choban et al. | |
| 2006/0003217 A1 | 1/2006 | Cohen et al. | |
| 2006/0035136 A1 | 2/2006 | Markoski et al. | |
| 2006/0040146 A1 | 2/2006 | Yamaguchi | |
| 2006/0040147 A1 | 2/2006 | Yamaguchi | |
| 2006/0059769 A1 | 3/2006 | Masel et al. | |
| 2006/0078785 A1 | 4/2006 | Masel et al. | |
| 2006/0088744 A1 | 4/2006 | Markoski et al. | |
| 2006/0210867 A1 | 9/2006 | Kenis | |
| 2006/0228622 A1 | 10/2006 | Cohen et al. | |
| 2007/0190393 A1 | 8/2007 | Markoski et al. | |
| 2008/0070083 A1 | 3/2008 | Markoski et al. | |
| 2008/0248343 A1* | 10/2008 | Markoski et al. | 429/15 |
| 2008/0274393 A1 | 11/2008 | Markoski et al. | |
| 2009/0035644 A1 | 2/2009 | Markoski et al. | |

FOREIGN PATENT DOCUMENTS

| | | |
|---|---|---|
| EP | 0 664 930 B1 | 5/1996 |
| EP | 1 818 654 A1 | 8/2007 |
| EP | 1 819 004 A1 | 8/2007 |
| GB | 1018825 | 2/1966 |
| GB | 1 416 483 | 12/1975 |
| JP | 46-16452 | 5/1971 |
| JP | 4-284889 | 10/1992 |
| JP | 10-211447 A | 8/1998 |
| JP | 2005-515602 | 5/2005 |
| WO | WO 94/09524 | 4/1994 |
| WO | WO 96/12317 | 4/1996 |
| WO | WO 98/06145 | 2/1998 |
| WO | WO 00/15872 | 3/2000 |
| WO | WO 01/37357 | 5/2001 |
| WO | WO 01/39307 A2 | 5/2001 |
| WO | WO 01/54216 A2 | 7/2001 |
| WO | WO 01/94450 A2 | 12/2001 |
| WO | WO 02/11226 A2 | 2/2002 |
| WO | WO 03/009410 A2 | 1/2003 |
| WO | WO 03/061037 | 7/2003 |
| WO | WO 03/106966 A2 | 12/2003 |
| WO | WO 2004/027891 A2 | 4/2004 |
| WO | WO 2004/027901 A2 | 4/2004 |
| WO | WO 2005/001975 | 1/2005 |
| WO | WO 2005/004262 | 1/2005 |
| WO | WO 2005/082024 | 9/2005 |
| WO | WO 2006/101967 | 9/2006 |
| WO | WO 2007013880 | 2/2007 |
| WO | WO 2007/095492 | 8/2007 |
| WO | WO 2008/122042 | 10/2008 |

OTHER PUBLICATIONS

Granados-Focil et al., "Polyphenylene Sulfonic Acid: a new PEM", http://www1.eere.energy.gov/hydrogenandfuelcells/pdfs/hi_tem_pems_talk.pdf, 26 pages, 2003.

Jiang et al., "$CO_2$ Crossover Through a Nafion Membrane in a Direct Methanol Fuel Cell", Electrochemical and Solid-State Letters, 5 (7), pp. A156-A159, 2002.

Service, "New Polymer May Rev Up the Output of Fuel Cells Used to Power Cars", Science, vol. 312, p. 35, 2006.

Thomas et al., "Fuel Cells—Green Power", Los Alamos National Laboratory, http://www.scied.science.doe.gov/nmsb/hydrogen/Guide%20to%20Fuel%20Cells.pdf, 36 pages, 1999.

Hejze et al., "Preparation of Pd-coated polymer electrolyte membranes and their application in direct methanol fuel cells", Journal of Power Sources, 140, pp. 21-27, 2005.

Kordesch et al., "Direct methanol-air fuel cells with membranes plus circulating electrolyte", Journal of Power Sources, 96, pp. 200-203, 2001.

Li et al., "An improved palladium-based DMFCs cathode catalyst", Chem. Commun., pp. 2776-2777, 2004.

Peled et al., "0.5 $W/cm^2$ Direct Methanol-Air Fuel Cell", Electrochemical and Solid-State Letters, 7 (12), pp. A507-A510, 2004.

Baker, "Membrane Technology," Encyclopedia of Polymer Science and Technology, vol. 3, pp. 184-249, 2001.

Kim et al., "Non-Naifion Membrane Electrode Assemblies", Los Alamos National Laboratory, http://www.hydrogen.energy.gov/pdfs/review06/fc_3_kim.pdf, pp. 1-24, 2005.

Shim et al., Nafion-impregnated polyethylene-terephthalate film used as the electrolyte for direct methanol fuel cells, Electrochimica Acta, 50, pp. 2385-2391, 2005.

"Celtec® V-Membrane for DMFC Applications", PEMAS Fuel Cell Technologies, 6 pages, printed Jul. 19, 2005.

Rozière et al., "Non-Fluorinated Polymer Materials for Proton Exchange Membrane Fuel Cells", Annu. Rev. Mater. Res., 33, pp. 503-555, 2003.

Shim et al., "Electrochemical Acceleration of Hydrogen Transfer Through a Methanol Impermeable Metallic Barrier", Journal of the Electrochemical Society, 150 (12), pp. A1583-A1588, 2003.

Tang et al., "Modification of Nafion™ membrane to reduce methanol crossover via self-assembled Pd nanoparticles", Materials Letters, 59, pp. 3766-3770, 2005.
Peled et al., "A Direct Methanol Fuel Cell Based on a Novel Low-Cost Nanoporous Proton-Conducting Membrane", Electrochemical and Solid-State Letters, 3 (12), pp. 525-528, 2000.
Peled et al., "Novel approach to Recycling Water and Reducing Water Loss in DMFCs", Electrochemical and Solid-State Letters, 6 (12), pp. A268-A271, 2003.
Blum et al., "Water-neutral micro direct-methanol fuel cell (DMFC) for portable applications", Journal of Power Sources, 117, pp. 22-25, 2003.
Zhu et al., "The behavior of palladium catalysts in direct formic acid fuel cells", Journal of Power Sources, 139, pp. 15-20, 2005.
Sigracet, GDL 24 & 25 Series Gas Diffusion Layer, product information, SGL Carbon Group, 2 pages, 2004.
Choi et al., "Modification of proton conducting membrane for reducing methanol crossover in a direct-methanol fuel cell", Journal of Power Sources, 96, pp. 411-414, 2001.
Pu et al., "A Methanol Impermeable Proton Conducting Composite Electrolyte System", Journal of the Electrochemical Society, 142, pp. L119-L120, 1995.
Kim et al., "Evaluation of a palladinized Nafion™ for direct methanol fuel cell application", Electrochimica Acta, 49, pp. 3227-3234, 2004.
Halliday. et al., "Fundamentals of Physics", Extended Third Edition, pp. 662-685, 1988.
Osmonics The Filtration Spectrum, Osmonics, Inc., Minnetonka, Minnesota, 1 page, (1984).
Xia, S.J. et al., Proceedings of the $207^{th}$ Meeting of the Electrochemical Society, Abstract #779, Quebec City, Canada, May 21-25, (2005).
Choban, E.R. et al., "Microfluidic Fuel Cells That Lack A PEM", Power Sources Proceedings, vol. 40, pp. 317-320, (2002).
Choban, E.R. et al., "Membraneless Fuel Cell Based On Laminar Flow," ASME Fuel Cell Science, Engineering and Technology Proceedings, pp. 261-265, (2003).
Ferrigno, R. et al., "Membraneless Vanadium Redox Fuel Cell Using Laminar Flow", J. Am. Chem. Soc., vol. 124, pp. 12930-12931, (2002).
Choban, E.R. et al., "Characterization of Limiting Factors in Laminar Flow-Based Membraneless Microfuel Cells", Electrochemical and Solid-State Letters, 8 (7), pp. A348-A352, (2005).
Choban, E.R. et al., "Microfluidic Fuel Cell Based on Laminar Flow", J. Power Sources, 128, pp. 54-60, (2004).
www.whatman.com "Leadership in separations technology for the life Sciences", 1 page, (2009).
Jankowski, A.F. et al., "Micro-Fabricated Thin-film Fuel Cells for Portable Power Requirements", Spring Meeting of the Materials Research Society, San Francisco, CA, Apr. 1-5, 2002, 7 pages, (2002).
Chan, K-Y et al., "Meniscus behavior and oxygen reduction in tapered pore gas diffusion electrodes", Electrochimica Acta, vol. 33, No. 12, pp. 1767-1773, (1988).
Chan, K-Y et al., "A wedge-meniscus model of Gas-Diffusion Electrodes", Electrochimica Acta, 32, 8, pp. 1227-1232, (1987).
Waszczuk, P. et al., "Methanol Electrooxidation on Platinum/Ruthenium Nanoparticle Catalysts", Journal of Catalysis, 203, pp. 1-6, (2001).
Peng, F.Z. et al., "A new ZVS bidirectional dc-dc converter for fuel cell and battery application," IEEE Transactions on Power Electronics, 19, 1, pp. 54-65, (2004).
Krein, P.T. et al., "Low cost inverter suitable for medium-power fuel cells," IEEE Power Electronics Specialists Conference, vol. 1, pp. 321-326, (2002).
Cygan, P.J. et al., "Hybrid Power Sources for Military Applications," The Eighteenth Annual Battery Conference on Applications and Advances, pp. 85-90, (1998).
Jarvis, L.P. et al., "Hybrid Power Source for Manportable Applications," IEEE Aerospace and Electronic Systems Magazine, 18, 1, pp. 13-16, (2003).
Atwater, T.B. et al., "Man portable power needs of the $21^{st}$ century," Journal of Power Sources, vol. 91, No. 1, pp. 27-36, (2000).

Jarvis, L.P. et al., "Fuel cell/Lithium-ion battery hybrid for manportable applications," The Seventeenth Annual Battery Conference on Applications and Advances, pp. 69-72, (2002).
Gao, L. et al. "An actively controlled fuel cell/battery to meet pulsed power demands," Journal of Power Sources, 130, pp. 202-207, (2004).
Zheng, J.P. et al., "Hybrid power sources for pulsed current applications," IEEE Transactions on Aerospace and Electronic Systems, vol. 37, pp. 288-292, (2001).
Jiang, Z. et al., "Design and experimental tests of control strategies for active hybrid fuel cell/battery power sources," Journal of Power Sources, 130, pp. 163-171 (2004).
Acharya, P. et al., "An advanced fuel cell simulator," IEEE Applied Power Electronics Conference, pp. 1554-1558, (2004).
Weigl, B.H. et al., "Microfluidic diffusion-based separation and detection", Science, 283, pp. 346-347, (1999).
Kenis, P.J.A. et al., "Microfabrication Inside Capillaries Using Multiphase Laminar Flow Patterning", Science, vol. 285, pp. 83-85, (1999).
Wesseler, E.P. et al., "The Solubility of Oxygen in Highly Fluorinated Liquids", Journal of Fluorine Chemistry, 9, pp. 137-146, (1977).
Riess, J.G. et al., "Solubility and Transport Phenomena in Perfluorochemicals Relevant to Blood Substitution and Other Biomedical Applications", Pure & Appl. Chem., vol. 54, No. 12, pp. 2383-2406, (1982).
International Search Report dated Oct. 25, 2006 for PCT application No. PCT/US05/05962.
Rice, C. et al., "Direct Formic Acid Fuel Cells", Journal of Power Sources, vol. 111, pp. 83-89, (2002).
Lu, G-Q et al., "Formic Acid Decomposition on Polycrystalline Platinum and Palladized Platinum Electrodes", J. Phys. Chem., vol. 103, pp. 9700-9711, (1999).
Waszczuk, P. et al., "A nanoparticle catalyst with superior activity for electrooxidation of formic acid", Electrochemistry Communications, vol. 4, pp. 599-603, (2002).
International Search Report dated Mar. 30, 2007 for PCT application No. PCT/US05/32990.
Park, S. et al., "Electrochemical Infrared Characterization of CO Domains on Ruthenium-Decorated Platinum Nanoparticles" J. Am. Chem. Soc. 125, pp. 2282-2290, (2003).
Babu, P.K. et al., "Electronic Alterations Caused by Ruthenium in Pt-Ru Alloy Nanoparticles as Revealed by Electrochemical NMR", J. Phys. Chem., 107, pp. 7595-7600, (2003).
Hentges, P.J. et al., "Planar tunneling spectroscopic studies of splitting vs. non-splitting of the zero-bias conductance peak in $YBa_2Cu_3O_{7-x}$ thin films", Physica C, 408-410, pp. 801-803, (2004).
Hentges, P.J. et al., "Solution-growth of ultra-thin, insulating layers of zirconia for passivation and tunnel junction fabrication on YBCO thin films", IEEE Transactions on Applied Superconductivity, v. 13, No. 2, pp. 801-804, (2003).
Greene, L.H. et al., "Planar tunneling spectroscopy of high-temperature superconductors: Andreev bound states and broken symmetries", Physica C, 387, pp. 162-168, (2003).
Greene, L.H. et al., "Detection and Control of Broken Symmetries with Andreev Bound State Tunneling Spectroscopy: Effects of Atomic-Scale Disorder", Physica C, 408-410, pp. 804-806, (2004).
Kimball, J.W. et al., "Issues with low-input-voltage boost converter design," IEEE Power Electronics Specialists Conference, Aachen, Germany, pp. 2152-2156, (2004).
Ismagilov, R.F. et al., "Experimental and theoretical scaling laws for transverse diffusive broadening in two-phase laminar flows in microchannels," Applied Physics Letters, vol. 76, No. 17, pp. 2376-2378, (2000).
Ismagilov, R.F. et al., "Pressure-driven laminar flow in tangential microchannels: an elastomeric microfluidic switch", Anal. Chem., 73, pp. 4682-4687, (2001).
Dobbs, B.G. et al., "A multiple-input dc-dc converter topology", IEEE Power Electronic Letters, vol. 1, No. 1, pp. 6-9, (2003).
Musunuri, S. et al., "Fabrication and Characterization of PDMA Inductors", IEEE Power Electronics Specialists Conference, Aachen, Germany, pp. 4460-4466, (2004).

Coutanceau, C. et al., "Radioactive Labeling Study and FTIR Measurements of Methanol Adsorption and Oxidation on Fuel Cell Catalysts", Fuel Cells, 2, pp. 153-158, (2002).

Jankowski A.F., et al., "Sputter Deposition of Metallic Sponges", 48th International Symposium on the American Vacuum Society, San Francisco, CA, Oct. 26-Nov. 2, 2001, 14 pages (2001).

Guo, J-W., et al., "Effect of Current collector corrosion made from Printed Circuit Board (PCB) on the degradation of self-breathing direct methanol fuel cell stack", Electrochimica Acta, 53, pp. 3056-3064, (2008).

Morse, J. et al., "An Integrated Microfluidic Fuel Cell System for Energy Conversion from Hydrocarbon Fuels", Electrochemical Society Spring Symposium, Philadelphia, PA, May 12-17, 2002, 1 page, (2002).

Park H.G. et al., "Transport in a Microfluidic Catalytic Reactor", Proceedings of HT2003, ASME Summer Heat Transfer Conference, Jul. 21-23, 2003, Las Vegas, Nevada, pp. 1-10, (2003).

Zhang, J. et al., "Electrochemical Measurement of $O_2$ Permeation Rate through Polymer Electrolyte Membranes", 216th ECS Meeting, Abstract #830, The Electrochemical Society, 1 page, (2009).

Chu, D. et al., Alkaline Membrane Electrolyte Fuel Cell Research and Development at the U.S. Army Research Laboratory, 216th ECS Meeting, Abstract #385, The Electrochemical Society, 1 page, (2009).

Jiang, R. et al., "Water and Fuel Crossover in a Direct Methanol Fuel Cell Stack", 212th ECS Meeting, Abstract #601, The Electrochemical Society, 1 page, (2007).

Jiang, R. et al., "A Palladium Deposited Nafion Membrane via Supercritical Carbon Dioxide (sc-$CO_2$) Medium for DMFCs", 207th ECS Meeting, Abstract #784, The Electrochemical Society, 1 page, (2005).

Jiang, R. et al., "Sol-Gel Derived Nafion/Silica Hybrid Electrolyte Membranes for Direct Methanol Fuel Cells (DMFCs)", 207th ECS Meeting, Abstract #56, The Electrochemical Society, 1 page, (2005).

Jiang, R. et al., "Direct Methanol Fuel Cell System Performance: From Materials, Components, to System and Fuel Efficiency", 209th ECS Meeting, Abstract #1143, The Electrochemical Society, 1 page, (2006).

Jiang, R. et al., "Durability Evaluation of Direct Methanol Fuel Cells", 208th ECS Meeting, Abstract #1216, The Electrochemical Society, 1 page, (2005).

Jiang, R. et al., "Comparison of Several Research Approaches for Direct Methanol Fuel Cell Membranes", 208th ECS Meeting, Abstract #965, The Electrochemical Society, 1 page, (2005).

Jankowski, A.F. et al., Micro-Fabricated Thin-Film Fuel Cells for Portable Power Requirements, Mat. Res. Soc. Symp.Proc., vol. 730, pp. V4.2.1-V4.2.6, (2002).

Choban, E.R, et al., "Microfluidic fuel cell based on laminar flow", Journal of Power Sources, vol. 128, pp. 54-60, (2004).

International Search Report dated May 29, 2006 for application No. PCT/US2004/020597.

Kenis, P.J.A, et al, "Fabrication inside microchannels using fluid flow", Accounts of Chemical Research, vol. 33, No. 12, pp. 841-847, (2000).

E. Choban, et al, "Microfluidic Fuel Cells That Lack A PEM" Power Sources Proceedings, vol. 40, 2002, pp. 317-320, XP009031634.

R. Ferrigno, et al, "Membraneless Vanadium Redox Fuel Cell Using Laminar Flow" JACS Communications, vol. 124, 2002, pp. 12930-12931, XP002282850.

M. Mench, et al, "Design of Micro Direct Methanol Fuel Cell (Proceedings of the IMECE'01, Nov. 11-16, 2001)", 2001, The American Society of Mechanical Engineers, New York XP002282851.

S. C. Kelley, et al, "A Miniature Methanol/Air Polymer Electrolyte Fuel Cell", Electrochemical and Solid-State Letters, IEEE Service Center, Piscataway, NJ, vol. 3, No. 9, 2000, pp. 407-409, XP001023907.

Branebjerg et al, "Application of Miniature Analyzers from Microfluidic Components to uTAS," Proceedings of Micro Total Analysis Systems Conference, Netherlands, 1994, pp. 141-151.

Brody et al, "Diffusion-Based Extraction in a Microfabricated Device," Sensors and Actuators, 1997, pp. 13-18, vol. A58.

Carrette et al, "Fuel Cells-Findamentals and Applications," Fuel Cells, 2001, pp. 5-39, Vol. I.

Duffy et al, "Rapid Prototyping of Microfluidic Systems in Poly(dimethylsiloxane),"Anal. Chem, 1998, pp. 4974-4984, vol. 70.

EG&G Services et al, Fuel Cell Handbook, Fifth Edition, 2000, U.S. Department of Energy, Office of Fossil Energy, National Energy Technology Laboratory, pp. I-xiii, 1-1 to 12-4.

Heinzel et al, "A Review of the State-of-the-Art of the Methanol Crossover in Direct Methanol Fuel Cells," J. Power Sources, 1999, pp. 70-74, vol. 84.

Kenis et al, "Microfabrication Inside Capillaries Using Multiphase Laminar Flow Patterning," Science, 1999, pp. 83-85, vol. 285.

Kim et al, "Diffusion-Based Sample Cleanup Microchip for Protein Analysis by Electrospray Ionization Mass Spectrometry," obtained at http://pittcon.omnibooksonline.comR001/papers/0226.pdf as of at least Jul. 24, 2001, 2 pages.

Pickett et al, "Ionic Mass Transfer in Parallel Plate Electrochemical Cells," J. Applied Electrochemistry, 1972, pp. 151-156, vol. 2.

Thomas et al, "Los Alamos National Laboratory Monograph LA-UR-99-3231," Fuel Cells: Green Power, 1999, pp. 1-33.

Waszczuk et al, "Methanol Electrooxidation on Platinum-RutheniumNanoparticle Catalysts," J. Catalysis, 2001, pp. 1-6, vol. 203.

Zhao et al, "Surface-Directed Liquid Flow Inside Microchannels," Science, 2001, pp. 1023-1026, vol. 291.

Markoski, "Summary of Knowledge About Laminar Flow Fuel Cells," 2002, 1 page.

Ro et al, "Sample Clean-Up Using Multiphase Laminar Microfluidics for Electrospray Ionization Mass Spectrometry," obtained at http://nanotech.osu.edu/abstracts/hahn.htm as of at least Jul. 24, 2001, 2 pages.

Delphion search conducted Oct. 23, 2002, for U.S. patents containing "perfluorocarbon" and fuel cell in the claims, 1 page.

Delphion search conducted Oct. 23, 2002, for U.S. patents containing fuel cell and oxygen carrier and "perfluror",1 page.

Delphion search conducted Aug. 23, 2002, for U.S. patents and applications containing "pefluoro" and "ballard",1 page.

Delphion search conducted Aug. 23, 2002, for U.S. patents containing "perflurocarbons", 2 pages.

Davis, "NISTIR 6848, Proposed Testing Methodology and Laboratory Facilities for Evaluating Residential Fuel Cell Systems," NIST, 2002, 14 pages.

Dupont Zonyl FS-62, Fluorosurfactant Information Sheet, 2001, 2 pages.

Riess et at, °Solubility and Transport Phenomena in Perfluorochemicals Relevant to Blood Substitution and Other Biomedical Applications, Pure & Appl. Chem, 1982, pp. 2383-2406, vol. 54.

Wesseler et al, The Solubility of Oxygen in Highly Fluorinated Liquids, J. Fluorine Chem, pp. 137-146, vol. 9.

Gang, X, et al, "Electrolyte additives for phosphoric acid fuel cells", Journal of the Electrochemical Society, vol. 140, No. 4, pp. 896-902, (1993).

International Search Report dated Dec. 13, 2005 for PCT application No. PCT/US2004/020342.

Kronberger, H, et al, "Reduction of oxygen from electrolyte emulsions with high oxygen contents", Journal of Power Sources, vol. 86, pp. 562-567, (2000).

International Search Report dated Jun. 21, 2004 for PCT application No. PCT/US2003/00226.

Kelley et al, "Miniature Fuel Cells Fabricated on Silicon Substrates," AIChE Journal 48, pp. 1071-1082, 2002.

Maynard et al, "Miniature fuel cells for portable power: Design considerations and challenges," J. Vac. Sci. Technol, B 20(4), pp. 1287-1297, 2002.

Steele et al, "Materials for fuel-cell technologies", Nature, vol. 414, pp. 345-352, 2001.

Lu et al, Development and characterization of a silicon-based micro direct methanol fuel cell, Electrochimica Acta 49, pp. 821-828, 2004.

Yeom et al, "Microfabrication and characterization of a silicon-based millimeter scale, PEM fuel cell operating with hydrogen, methanol, or formic acid," Sensors and Actuators, B, 107, pp. 882-891, 2005.

Lee et al, "Design and fabrication of a micro fuel cell array with "flip-flop" interconnection," Journal of Power Sources, 112, pp. 410-418, 2002.

Hahn et al, "Development of a planar micro fuel cell with thin film and micropatterning technologies," Journal of Power Sources, 131, pp. 73-78, 2004.

Mitrovski et al, "Microfluidic Devices for Energy Conversion: Planar Integration and Performance of a Passive, Fully Immersed H2-O2 Fuel Cell," Langmuir, 20, pp. 6974-6976, 2004.

Meyers et al, "Design considerations for miniaturized PEM fuel cells," Journal of Power Sources, 109, pp. 76-88 2002.

Yen et al, "A micro methanol fuel cell operating at near room temperature," Applied Physics Letters, vol. 83, No. 19, pp. 4056-4058, 2003.

Motokawa et al, MEMS-based design and fabrication of a new concept micro direct methanol fuel cell (µ-DMFC), Electrochemistry Communications, 6, pp. 562-565, 2004.

Ha, et al, "A miniature air breathing direct formic acid fuel cell," Journal of Power Sources, 128, pp. 119-124, 2004.

Ismagilov et al, "Experimental and theoretical scaling laws for transverse diffusive broadening in two-phase laminar flows in microchannels," Applied Physics Letters, vol. 76, No. 17, pp. 2376-2378, 2000.

Kamholz et al, "Quantitative Analysis of Molecular Interaction in a Microfluidic Channel: The T-Sensor," Anal. Chem, 71, pp. 5340-5347, 1999.

Krishnan et al, "Microfabricated reaction and separation systems", Current Opinion in Biotechnology 12, p. 92, 2001.

Zheng et al, "Formation of Arrayed Droplets by Soft Lithography and Two-Phase Fluid Flow, and Application in Protein Crystallization," Adv. Mater, 16, No. 15, 1365-1368, 2004.

Cohen et al, "Fabrication and preliminary testing of a planar membraneless microchannel fuel cell", J. Power Sources, 139, pp. 96-105, 2005.

Spendelow et al, "Electrooxidation of adsorbed CO in Pt(1 1 1) and Pt(1 1 1)/Ru in alkaline media and comparison with results from acidic media," Journal of Electroanalytical Chemistry, 568, pp. 215-224, 2004.

McLean et al, "An assessment of alkaline fuel cell technology," International Journal of Hydrogen Energy, 27, pp. 507-526, 2002.

Prabhuram et al, "Investigation of methanol oxidation on unsupported platinum electrodes in strong alkali and strong acid," Journal of Power Sources, 74, pp. 54-61, 1998.

Tripkovic et al, "Methanol oxidation at platinum electrodes in alkaline solution: comparison between supported catalysts and model systems," Journal of Electroanalytical Chemistry, 572, pp. 119-128, 2004.

Agel et al, "Characterization and use of anionic membranes for alkaline fuel cells," Journal of Power Sources, 101, pp. 267-274, 2001.

Wang et al, "A feasibility analysis for alkaline membrane direct methanol fuel cell: thermodynamic disadvantages versus kinetic advantages," Electrochemistry Communications, 5, 662-666, 2003.

Danks et al, "Alkaline anion-exchange radiation-grafted membranes for possible electrochemical application in fuel cells," J. Mater. Chem, 13, pp. 712-721, 2003.

Yu et al, "Development of direct methanol alkaline fuel cells using anion exchange membranes," Journal of Power Sources, 137, pp. 248-256, 2004.

Iwasita, "Electrocatalysis of methanol oxidation", Electrochim. Acta 47, pp. 3663-3674, 2002.

Barton et al, "Enzymatic Biofuel Cells for Implantable and Microscale Devices," Chem. Rev, 104, pp. 4867-4886, 2004.

Astris Energi Inc, "Advantages of the Alkaline Fuel Cell," can be located at: http://www.fuelcellmarkets.com/article_default_view.fcm ?articleid=6194&subsite=912, 1 page, 2005.

Chen et al, "A Miniature Biofuel Cell," J. Am. Chem. Soc, 123, pp. 8630-8631, 2001.

Mano et al, "A Miniature Biofuel Cell Operating in a Physiological Buffer," J. Am. Chem. Soc, 124, pp. 12962-12963, 2002.

Kim et al, "A Miniature Membrane-less Biofuel Cell Operating under Physiological Conditions at 0.5 V," A. J. Electrochem. Soc. 150 (2), A209-A213, 2003.

Mano et al, "A Miniature Membraneless Biofuel Cell Operating at 0.36 V under Physiological Conditions," Journal of the Electrochemical Society, 150, 8, pp. A1136-A1138, 2003.

Mano et al, "Characteristics of a Miniature Compartment-less Glucose-O2 Biofuel Cell and Its Operation in a Living Plant," J. Am. Chem. Soc, 125, pp. 6588-6594, 2003.

Choban et al, "Characterization of Limiting Factors in Laminar Flow-Based Membraneless Microfuel Cells," Electrochemical and Solid State Letters,8 (7), pp. A348-A352, 2005.

Choban et al, "Membraneless laminar flow-based micro fuel cells operating in alkaline, acidic, and acidic/alkaline media," Electrochimica Acta, vol. 50, No. 27, pp. 5390-5398, 2005.

Cohen et al, "A Dual Electrolyte H2/O2 Planar Membraneless Microchannel Fuel Cell System with Open Circuit Potentials in Excess of 1.4 V," Lagmuir 21, pp. 3544-3550, available online Mar. 16, 2005.

Skoog et al, "Electrochemical Cells," Fundamentals of Analytical Chemistry, CBS College Publishing, 4th ed, p. 306, 1982.

FCTec, "Alkaline Fuel Cells (AFC)," can be located at: http://www.fctec.com/fctec_ types_afc.asp, 1 page, 2005.

Tse, "Alkaline Fuel Cell," can be located at: http://www.visionengineer.com/env/al.php, 1 page, 2005.

Neah Power Systems, located at www.neahpower.com, 42 pages, 2003-2004.

INI Power Systems, located at www.inipower.com, 3 pages, 2004.

Yeom et al, "A Silicon Microfabricated Direct Formic Acid Fuel Cell," ASME Fuel Cell Science, Engineering and Technology Proceedings, pp. 267-272, 2003.

Yeom et al, "A Microscale Vapor-Fed Formic Acid Fuel Cell," Solid-State Sensors and Actuators Workshop, Hilton Head Island, SC, pp. 125-128, Jun. 2004.

Choban et al, "Membraneless Fuel Cell Based on Laminar Flow," ASME Fuel Cell Science, Engineering and Technology Proceedings, pp. 261-265, 2003.

Choban et al, "Microfluidic Fuel Cells That Lack a PEM," Power Sources Proceedings, 40, pp. 317-320, 2002.

Invitation to Pay Additional Fees and Partial Search Report dated Feb. 5, 2007 for PCT application No. PCT/US2006/009502, 9 pages.

Chen, C.Y. et al., "Portable DMFC system with methanol sensor-less control", Journal of Power Sources, 167, pp. 442-449, (2007).

Livshits, V. et al., "Direct ethylene glycol fuel-cell stack—Study of oxidation intermediate products", Journal of Power Sources, 178, pp. 687-691, (2008).

Cooper, K.R. et al., "Electrical Test Methods for On-Line Fuel Cell Ohmic Resistance Measurement", Journal of Power Sources, vol. 160, pp. 1088-1095, (2006).

Niemann, J., "Unraveling Fuel Cell Electrical Measurements", Fuel Cell Magazine, Apr./May, pp. 26-31, (2005).

Smith, M. et al., "Comparison of Fuel Cell Electrolyte Resistance Measurement Techniques", Fuel Cell Magazine, Apr./May, pp. 32-37, (2005).

* cited by examiner

SYSTEM FOR FLEXIBLE IN SITU CONTROL OF WATER IN FUEL CELLS

BACKGROUND

Fuel cell technology shows great promise as an alternative energy source for numerous applications. Several types of fuel cells have been constructed, including polymer electrolyte membrane fuel cells, direct methanol fuel cells, alkaline fuel cells, phosphoric acid fuel cells, molten carbonate fuel cells, and solid oxide fuel cells. For a comparison of several fuel cell technologies, see Los Alamos National Laboratory monograph LA-UR-99-3231 entitled *Fuel Cells: Green Power* by Sharon Thomas and Marcia Zalbowitz.

FIG. 1 represents an example of a fuel cell 100, including a high surface area anode 110 including an anode catalyst 112 (typically platinum alloy), a high surface area cathode 120 including a cathode catalyst 122 (typically platinum), and an electrolyte 130 between the anode and the cathode. The electrolyte may be a liquid electrolyte; it may be a solid electrolyte, such as a polymer electrolyte membrane (PEM); or it may be a liquid electrolyte contained within a matrix, such as the electrolyte in a phosphoric acid fuel cell (PAFC).

In operation of the fuel cell 100, fuel in the gas and/or liquid phase is brought over the anode 110 where it is oxidized at the anode catalyst 112 to produce protons and electrons in the case of hydrogen fuel, or protons, electrons, and carbon dioxide in the case of an organic fuel. The electrons flow through an external circuit 140 to the cathode 120 where air, oxygen, or an aqueous oxidant (e.g., peroxide) constantly is being fed. Protons produced at the anode 110 travel through electrolyte 130 to cathode 120, where oxygen is reduced in the presence of protons and electrons at cathode catalyst 122 to produce water in the liquid and/or vapor state, depending on the operating temperature and conditions of the fuel cell.

Hydrogen and methanol have emerged as important fuels for fuel cells, particularly in mobile power (low energy) and transportation applications. The electrochemical half reactions for a hydrogen fuel cell are listed below.

| Anode: | $2 H_2$ | → | $4 H^+ + 4 e^-$ |
| --- | --- | --- | --- |
| Cathode: | $O_2 + 4 H^+ + 4 e^-$ | → | $2 H_2O$ |
| Cell Reaction: | $2 H_2 + O_2$ | → | $2 H_2O$ |

To avoid storage and transportation of hydrogen gas, the hydrogen can be produced by reformation of conventional hydrocarbon fuels. In contrast, direct liquid fuel cells (DLFCs) utilize liquid fuel directly, and do not require a preliminary reformation step of the fuel. As an example, the electrochemical half reactions for a Direct Methanol Fuel Cell (DMFC) are listed below.

| Anode: | $CH_3OH + H_2O$ | → | $CO_2 + 6 H^+ + 6 e^-$ |
| --- | --- | --- | --- |
| Cathode: | $1.5 O_2 + 6 H^+ + 6 e^-$ | → | $3 H_2O$ |
| Cell Reaction: | $CH_3OH + 1.5 O_2$ | → | $CO_2 + 2 H_2O$ |

These reaction schemes illustrate the production of water at the cathode during operation of these fuel cells. The water content of the cathode during fuel cell operation is affected by several factors, including production of water due to the normal course of the reduction reaction at the cathode, electro-osmotic drag of water from anode to cathode associated with proton ($H^+$) flow, and production of water from the oxidation of fuel that has crossed through the electrolyte to the cathode instead of reacting at the anode. If allowed to accumulate, liquid water from these processes can severely limit the rate at which further gaseous oxidant reaches the catalyst surface, resulting in an undesirable condition referred to as "cathode flooding". Consequently, water is typically removed from the cathode as vapor in the oxidant gas flow stream and either is vented from the system or is condensed external to the fuel cell. If desired, the recovered water may then be supplied to the anode. In general, the amount of water lost as vapor should be equal to the amount needed to stay in stoichiometric neutrality. If excess water in either the liquid or gaseous phase is vented from the system, then additional water must be provided to the fuel cell to avoid dehydration. If the water vapor is condensed for recycling within the system, the fuel cell can have significant undesirable parasitic losses associated with high operating oxidant stoichiometries. Moreover, the presence of an external condenser in the system can introduce additional weight, parasitic losses, and complexity to the fuel cell.

The performance of conventional DMFCs may suffer more than hydrogen fuel cells due to "methanol crossover," in addition to cathode flooding from water production and electro-osmotic drag. The material used to separate the liquid fuel feed from the gaseous oxidant feed in a DMFC is typically a stationary PEM that is not fully impermeable to methanol or other dissolved fuels. As a result, methanol fuel may cross over the membrane from the anode to the cathode, reacting with the cathode catalyst directly in the presence of oxygen to produce heat, water and carbon dioxide but no useable electric current. In addition to being an inherent waste of fuel, methanol crossover causes depolarization losses due to a mixed potential at the cathode and, in general, leads to decreased cell performance.

It is desirable to provide a system for controlling the amount of water at or within the cathode in a fuel cell where liquid water can potentially accumulate and inhibit oxygen transport. Preferably such a system would prevent and/or buffer the system against cathode flooding and, if needed, would recover the water produced by the fuel cell without the addition of significant parasitic losses or of increased system complexity in order to maintain water neutrality. It is also desirable to provide a fuel cell in which fuel crossover is minimized.

SUMMARY

In one aspect, the invention provides an electrochemical cell that includes an anode, a cathode including a gas diffusion electrode and having first and second surfaces, an inlet for gaseous oxidant that is in contact with the first surface of the cathode, a channel that is contiguous with the anode and with the second surface of the cathode, and a liquid electrolyte in the channel. Water generated at the cathode is transported by osmosis into the liquid electrolyte.

In another aspect of the invention, there is an electrochemical cell that includes an anode, a cathode including a gas diffusion electrode and having first and second surfaces, an inlet for gaseous oxidant in contact with the first surface of the cathode, a channel that is contiguous with the anode and with the second surface of the cathode, and a liquid electrolyte in the channel. The electrochemical cell can produce a current density of 200 mA/cm² without cathode flooding, in the absence of an external water management component.

In another aspect of the invention, there is a method of generating electricity from an electrochemical cell as described above. The method includes flowing a gaseous oxidant through the inlet in contact with the first surface of the cathode, flowing the liquid electrolyte through the channel, and contacting the anode with a fuel. Complementary half cell reactions take place at the cathode and anode.

In another aspect of the invention, there is an electrochemical cell that includes an anode including first and second surfaces, an inlet for fuel that is in contact with the second surface of the anode, a cathode including a gas diffusion electrode and having first and second surfaces, an inlet for gaseous oxidant that is in contact with the first surface of the cathode, and an electrolyte that is contiguous with the first surface of the anode and the second surface of the cathode. The fuel includes a liquid electrolyte, and the pressure of the gaseous oxidant is no greater than 0.14 MPa. The electrochemical cell can produce a current density of 200 mA/cm$^2$ without cathode flooding.

In another aspect of the invention, there is a method of generating electricity from the electrochemical cell as described above. The method includes flowing a fuel including a liquid electrolyte through the inlet in contact with the second surface of the anode, and flowing a gaseous oxidant through the inlet in contact with the first surface of the cathode. Complementary half cell reactions take place at the cathode and anode.

The following definitions are included to provide a clear and consistent understanding of the specification and claims.

The term "electrochemical cell" means a seat of electromotive force, as defined in *Fundamentals of Physics, Extended Third Edition* by David Halliday and Robert Resnick, John Wiley & Sons, New York, 1988, 662 ff. The term includes both galvanic (i.e., voltaic) cells and electrolytic cells, and subsumes the definitions of batteries, fuel cells, photocells (photovoltaic cells), thermopiles, electric generators, electrostatic generators, solar cells, and the like.

The term "osmosis" means the flux of solvent through a permeable material from a region of high chemical potential to a region of low chemical potential.

The term "cathode flooding" means a condition in a fuel cell in which at least a portion of the cathode catalyst is blocked from contact with oxidant gas due to the presence of liquid on the catalyst. The current density at which cathode flooding occurs can be measured by the polarization flooding test, as set forth in the present application.

The term "complementary half-cell reactions" means oxidation and reduction reactions occurring in an electrochemical cell.

The term "blocking layer" means a liquid-tight layer in which a concentration gradient can be maintained between two liquids of differing concentration on either side of the blocking layer. A blocking layer may permit a net flow of liquid molecules to pass between the two liquids, but prevents mixing of the bulk of the two liquids.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

The present invention makes use of the discovery that incorporation of a liquid electrolyte having sufficient osmotic pressure into an electrochemical cell may allow for the in situ removal of liquid water or prevention of liquid water from or within the cathode of the electrochemical cell. For an electrochemical cell that includes a liquid electrolyte between the cathode and the anode, a blocking layer between the liquid electrolyte and the cathode also may provide for a reduction in the crossover of fuel to the cathode. Electrochemical cells incorporating the liquid electrolyte may operate under neutral water conditions without using parasitic external water management devices such as condensers or evaporators.

Figure 1:
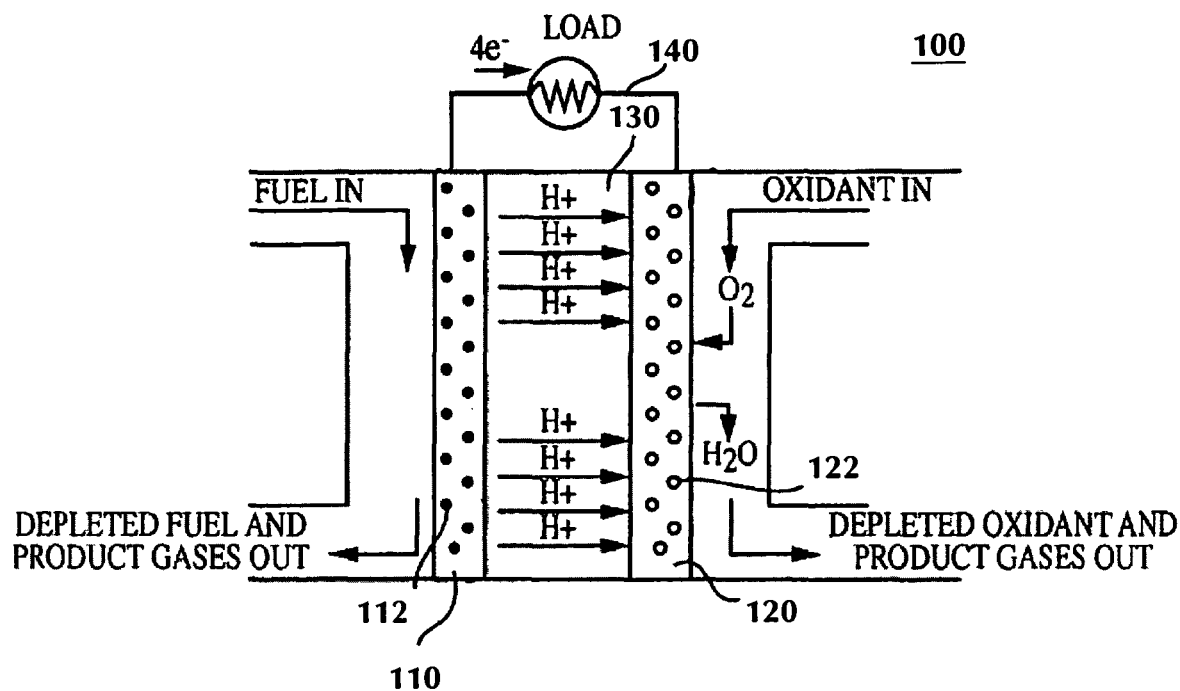
FIG. 1 is a schematic representation of a fuel cell.
Figure 2:
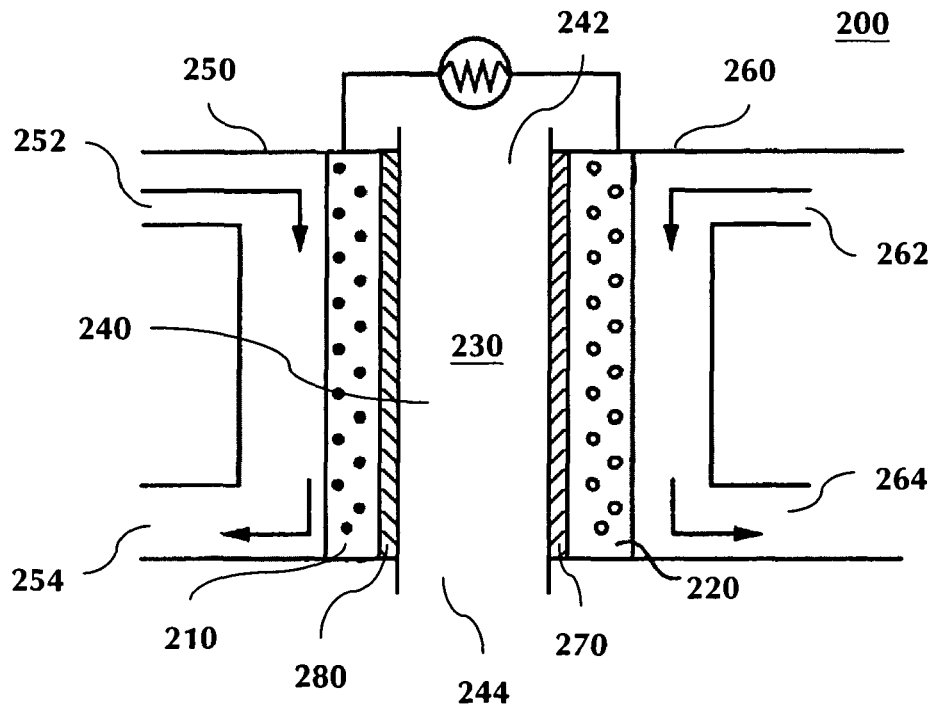
FIG. 2 is a schematic representation of an electrochemical cell including a liquid electrolyte between the anode and cathode.

FIG. 2 represents an example of an electrochemical cell 200 that includes an anode 210, a cathode 220, and a liquid electrolyte 230. The liquid electrolyte 230 is in a channel 240 between the anode 210 and the cathode 220. The channel 240 is contiguous with the anode and cathode and includes an electrolyte inlet 242 and an electrolyte outlet 244. The liquid electrolyte may contain a fuel. The anode 210 has first and second surfaces. The first surface is in contact with the electrolyte, and optional blocking layer 280 may be present at the first surface. The second surface of anode 210 optionally may be in contact with optional fuel channel 250, including a fuel inlet 252 and a fuel outlet 254. The fuel for reaction at the anode thus may be in the liquid electrolyte 230, in the optional fuel channel 250, or in both. The cathode 220 has first and second surfaces, and the first surface is in contact with an oxidant channel 260, including an oxidant inlet 262 and optional oxidant outlet 264. The second surface of cathode 220 is in contact with the channel 240, and optional blocking layer 270 may be present at the second surface.

The liquid electrolyte 230 may be any aqueous mixture of ions. The liquid electrolyte is characterized by an osmotic pressure (Π), which is defined as $$\Pi = (\text{solute concentration}) \times (\text{number of atoms or ions in solute}) \times R \times T$$

where R is the universal gas constant in units of kPa·m$^3$/mol·Kelvin, T is the temperature in units of Kelvin, and the solute concentration is in units of kmol/m$^3$, giving units of osmotic pressure in terms of kPa. Osmotic pressure of the liquid electrolyte can be measured by freezing point depression osmometry or vapor pressure osmometry, which may be carried out on a commercially available osmometer, such as those available from Advanced Instruments, Inc. (Norwood, Mass.) or from KNAUER ASI (Franklin, Mass.). Preferably the liquid electrolyte has an osmotic pressure of at least 1.2 megaPascals (MPa). More preferably the liquid electrolyte has an osmotic pressure of at least 2.5 MPa, more preferably of at least 3.5 MPa, more preferably of at least 10 MPa, more preferably of at least 15 MPa, more preferably of at least 20 MPa, and more preferably of at least 25 MPa. Preferably the liquid electrolyte has an osmotic pressure from 1.2 to 70 MPa, more preferably from 2.5 to 50 MPa, more preferably from 3.5 to 40 MPa.

Preferably the liquid electrolyte includes a protic acid. Examples of protic acids include hydrochloric acid (HCl), chloric acid ($HClO_3$), perchloric acid ($HClO_4$), hydroiodic acid (HI), hydrobromic acid (HBr), nitric acid ($HNO_3$), nitrous acid ($HNO_2$), phosphoric acid ($H_3PO_4$), sulfuric acid ($H_2SO_4$), sulfurous acid ($H_2SO_3$), trifluoromethanesulfonic acid (triflic acid, $CF_3SO_3H$) and combinations. More preferably the liquid electrolyte includes sulfuric acid. The liquid electrolyte may include sulfuric acid at a concentration of at least 0.25 moles/Liter (M). Preferably the liquid electrolyte includes sulfuric acid at a concentration of at least 0.5 M, more preferably at least 1.0 M, more preferably at least 1.5 M, more preferably at least 3.0 M, more preferably at least 4.0 M, and more preferably at least 5.0 M. Preferably the liquid electrolyte includes sulfuric acid at a concentration of from 0.25 to 9.0 M, more preferably from 0.5 to 7.0 M, more preferably from 0.75 M to 5.0 M, and more preferably from 1.0 to 3.0 M. The osmotic pressure of a liquid electrolyte including a protic acid may be further increased by the addition of non-acidic salts, such as halide, nitrate, sulfate, or triflate salts of alkali metals and alkaline earth metals or combinations.

The cathode 220 includes a porous conductor as the GDE, and preferably also contains a catalyst, so that a complementary half cell reaction may take place on the conductor. The half cell reaction at the cathode in a fuel cell is typically a reaction between a gaseous oxidant and ions from the electrolyte, such as $H^+$ ions. Examples of cathode catalysts include platinum and combinations of platinum with another metal, such as cobalt, nickel or iron. Any coating or layer present on the side of the GDE facing the electrolyte preferably allows for the conduction or permeation of ions to the catalyst layer and for back-permeation of water to the electrolyte, without allowing significant liquid breakthrough or hydraulic flooding of liquid electrolyte into the gas flow stream channels. In one example, the GDE may include a porous carbon substrate, such as teflonized (0-50%) carbon paper of 50-250 micron thickness. A specific example of this type of GDE is Sigracet® GDL 24 BC, available from SGL Carbon AG (Wiesbaden, Germany).

The electroactive area of the cathode preferably is protected from direct bulk contact with the liquid electrolyte. Preferably, the surface of the cathode in contact with the liquid electrolyte blocks the bulk hydraulic flow of liquid electrolyte into the cathode but permits water and protons to permeate between the liquid electrolyte and the cathode. The permeation of protons provides the reactant to the cathode that is necessary to complete the cell reaction with the oxidant. When solvated protons from the anode permeate to the cathode, an electro-osmotic drag may occur, providing a driving force for water to accumulate within the cathode structure. Conversely, product water may also back-permeate toward the anode, creating a force in opposition to electro-osmotic drag. This rate of-permeation of liquid water away from the cathode may be facilitated by the presence of a liquid electrolyte in the channel.

In one example, cathode 220 includes a GDE and a catalyst, where the catalyst forms a liquid-tight layer at the surface of the GDE. In this example, it is preferable for the portion of the catalyst in contact with the electrolyte to be hydrophilic, so as to facilitate the permeation of water through the liquid-tight layer. Such a liquid-tight catalyst layer may serve as a blocking layer 270.

In another example, cathode 220 includes a distinct blocking layer 270 between the GDE and the liquid electrolyte. Examples of blocking layers include inorganic networks, such as porous ceramics, zeolites and catalyst layers; organic networks, such as carbon tubes and crosslinked gels; membranes, such as microfiltration membranes, ultrafiltration membranes, nanofiltration membranes and ion-exchange membranes; and combinations of inorganic networks, organic networks and/or membranes, such as inorganic/organic composites. Preferably the blocking layer has a total thickness of 50 microns or less. If the blocking layer is too thick or too hydrophobic to maintain proton and water diffusion rates in either direction, the cathode can suffer resistive losses that inhibit performance of the electrochemical cell.

In one example, the blocking layer includes a membrane, such as a permeable polymeric material that restricts the permeation of at least one chemical substance. See, for example, Baker, R. W. "Membrane Technology," *Encyclopedia of Polymer Science and Technology*, Vol. 3, pp. 184-248 (2005). For example, the blocking layer may include a membrane that is typically used between the electrodes of a fuel cell. These fuel cell membranes include polymer electrolyte membranes (PEM), which may be cation-exchange membranes or anion-exchange membranes. Examples of PEMs that may be used as a blocking layer include polymers and copolymers derived at least in part from perfluorosulfonic acid, such as Nafion® (DuPont; Wilmington, Del.), Aciplex® S1004 (Asahi Chemical Industry Company; Tokyo, Japan), XUS-13204 (Dow Chemical Company; Midland, Mich.), and GORE-SELECT® (W. L. Gore; Elkton, Md.). These fuel cell membranes also include non-ionic membranes, such as expanded poly(tetrafluoroethylene) (i.e. GORE-TEX®, W. L. Gore); expanded polyethylene; membranes of aromatic polymers such as polyphenylene oxide (PPO), polyphenylene sulfide, polyphenylene sulfone (PPS), poly(etheretherketone) (PEEK), polybenzimidazole (PBI), polybenzazoles, polybenzothiazoles, polyimides, and fluorinated polystyrene; and membranes of inorganic-organic polymers, such as polyphosphazenes and poly(phenylsiloxanes). Non-ionic membranes or composite membranes typically serve as a matrix to hold the electrolyte between the two electrodes, and may be doped with acid electrolyte to become proton conducting. These non-ionic membranes may be functionalized with acid groups or ammonium groups to form cation-exchange membranes and anion-exchange membranes.

In another example, the blocking layer may include a film or porous layer onto which is bonded a catalyst, such as 4 $mg/cm^2$ Pt black. Unlike the membrane between the anode and cathode of a PEM fuel cell, which has catalyst on both sides of the membrane, this blocking layer has catalyst on only one side of the layer.

During operation of electrochemical cell 200, the liquid electrolyte 230 has an osmotic pressure that is greater than the osmotic pressure of the liquid water produced and accumulating at or within the cathode 220. This difference in osmotic pressure imposes a fluid pressure on the blocking layer 270 that may be greater than, and in a direction opposite to, the electro-osmotic drag typically produced in an electrochemical cell. Thus, there is a driving force for transport of this liquid water from the cathode, through the blocking layer, and into the electrolyte. Rather than building up at a rate greater than can be removed by the oxidant gas flow, the product water generated at the cathode may be transported by osmosis into the liquid electrolyte. Excess water may be at least partially recovered, and may be recycled back to the anode.

The liquid electrolyte may be transported in the channel at a rate of at least 10 cm/min. Preferably the liquid electrolyte is transported in the channel at a rate of at least 50 cm/min, and more preferably at least 100 cm/min. Preferably the liquid electrolyte is transported in the channel at a rate of from 10 to 1000 cm/min, more preferably from 50 to 500 cm/min, and more preferably from 100 to 300 cm/min.

Preferably the difference between the osmotic pressure of the liquid electrolyte and the osmotic pressure of the water generated at the cathode is at least 1 MPa. More preferably the difference between the osmotic pressure of the liquid electrolyte and the osmotic pressure of the liquid water generated at the cathode is at least 1.2 MPa, more preferably is at least 2.5 MPa, more preferably is at least 3.5 MPa, more preferably is at least 10 MPa, more preferably is at least 15 MPa, more preferably is at least 20 MPa, and more preferably is at least 25 MPa. Preferably the difference between the osmotic pressure of the liquid electrolyte and the osmotic pressure of the water generated at the cathode is from 1 to 70 MPa. More preferably the difference between the osmotic pressure of the liquid electrolyte and the osmotic pressure of the water generated at the cathode is from 1.2 to 70 MPa, more preferably from 2.5 to 50 MPa, more preferably from 3.5 to 40 MPa.

Preferably the fluid pressure created in opposition to the electro-osmotic drag is not of a magnitude that would prevent the flow of solvated ions through the blocking layer 270 toward the cathode 220. This fluid pressure is related to the difference in osmotic pressure, which is dependent on the osmotic pressure of the electrolyte and of the liquid water within the catalyst layer. Thus, adequate ion flux to maintain the reaction at the cathode can be ensured by controlling the concentration of the electrolyte and the water transport capabilities of the blocking layer. Preferably the electrolyte can act as a buffer, so that fluctuations in the water content of the electrolyte do not cause drastic changes in the osmotic pressure of the electrolyte. In one example, the volume of electrolyte in a holding chamber may be such that the electrolyte volume can change until the osmotic pressure of the electrolyte is great enough to recover the requisite product water to operate at water neutral conditions.

The oxidant supplied to the cathode may be a stream of air or gaseous oxygen. For an oxidant channel 260 having an oxidant outlet 264, maintaining an adequate pressure at the outlet may provide for essentially one-way diffusion of oxidant through the GDE of cathode 220. When pure oxygen is used as the gaseous oxidant, no depleted oxidant is formed. Thus, an oxidant outlet may be unnecessary, and the oxidant channel 260 may be closed off or may terminate near the end of cathode 220.

It is desirable for the oxidant pressure to be low, so that a compressor is not required for the oxidant. Compressors can be highly parasitic of the power generated by the electrochemical cell. Preferably the oxidant pressure is no greater than 20 pounds per square inch (psi; 0.14 MPa). More preferably the oxidant pressure is no greater than 15 psi (0.10 MPa), and more preferably is no greater than 10 psi (0.07 MPa). The oxidant flow rate may be expressed in terms of stoichiometric units, referred to herein as a "stoich". A "stoich" is defined as the flow rate of oxidant required to supply a stoichiometric amount of the oxidant to the cathode. This flow rate increases as the current density of the cell increases and is thus dependent on the current density of the cell. Preferably the flow rate of the oxidant is from 1 to 10 stoich, more preferably from 1.2 to 5 stoich, and more preferably from 1.5 to 3 stoich.

In an example of electrochemical cell 200, the anode 210 is in contact with fuel channel 250. A fuel composition flows through the channel from fuel inlet 252 to fuel outlet 254, contacting the catalyst of the anode to form protons and electrons. The fuel composition may contain a fuel such as hydrogen or an oxidizable organic compound. Oxidizable organic molecules that may be used as fuels in a fuel cell include organic molecules having only one carbon atom. Oxidizable organic molecules that may be used as fuels in a fuel cell include organic molecules having two or more carbons but not having adjacent alkyl groups, and where all carbons are either part of a methyl group or are partially oxidized. Examples of such oxidizable organic molecules include methanol, formaldehyde, formic acid, glycerol, ethanol, isopropyl alcohol, ethylene glycol and formic and oxalic esters thereof, oxalic acid, glyoxylic acid and methyl esters thereof, glyoxylic aldehyde, methyl formate, dimethyl oxalate, and mixtures thereof. Preferred fuels include gaseous hydrogen, gaseous pure methanol, liquid pure methanol and aqueous mixtures of methanol, including mixtures of methanol and an electrolyte.

In another example of electrochemical cell 200, fuel channel 250 is not present, the fuel instead being in the liquid electrolyte 230. The fuel in the liquid electrolyte contacts the catalyst of the anode to form protons and electrons. The liquid electrolyte may contain a fuel such as methanol. One potential complication of this example is that there is an increased risk of fuel crossover to the cathode 220, relative to an electrochemical cell having the anode positioned between the fuel composition and the liquid electrolyte. This risk may be minimized by using a barrier layer between the cathode and the liquid electrolyte and/or by using two liquid streams within the liquid electrolyte.

The anode 210 includes a catalyst that typically is platinum or a combination of platinum with another metal. Examples of bimetallic anode catalysts include combinations of platinum with ruthenium, tin, osmium or nickel. The anode may include a GDE. The electroactive area of the anode preferably is protected from direct bulk contact with the liquid electrolyte 230. The first surface of the anode may optionally include blocking layer 280, which may be the same material as present in optional blocking layer 270 or may be a different material. As described above for blocking layer 270, blocking layer 280 may be an inorganic network, an organic network, a membrane, or a composite of at least two of these.

Figure 3:
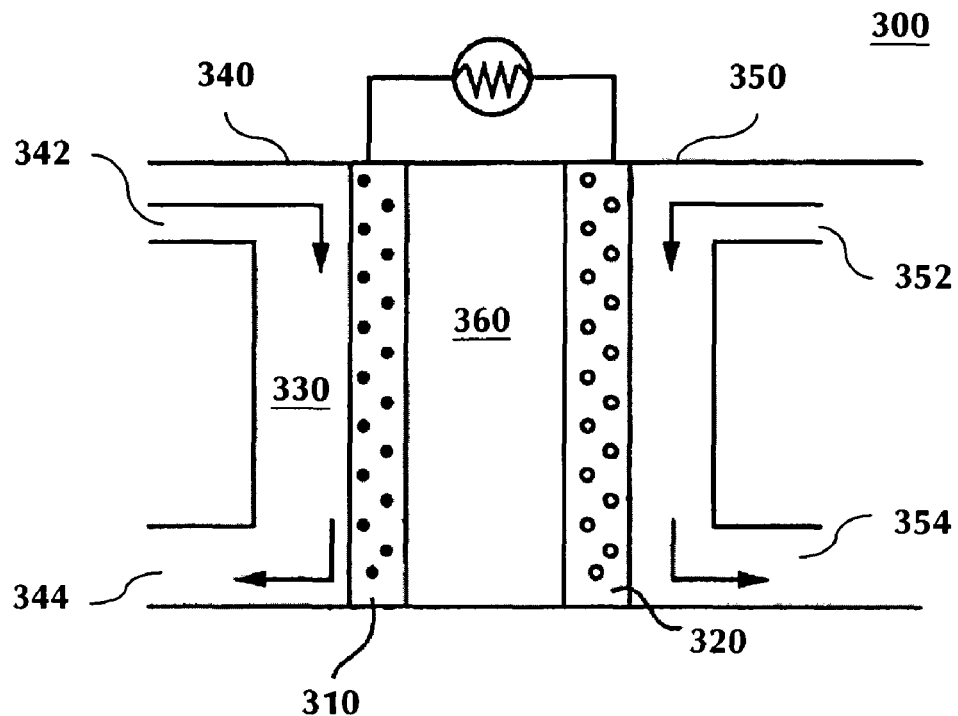
FIG. 3 is a schematic representation of an electrochemical cell including a liquid electrolyte in contact with the anode.

FIG. 3 represents an example of an electrochemical cell 300 that includes an anode 310, a cathode 320, and a liquid electrolyte 330. The electrochemical cell 300 further includes an electrolyte 360, which may be a PEM or a matrix material containing an electrolyte. Examples of matrix materials include inorganic networks, non-ionic membranes, and inorganic/organic composites. The anode 310 has first and second surfaces, and the first surface is in contact with the electrolyte 360. The second surface of anode 310 is in contact with a fuel channel 340, including a fuel inlet 342 and a fuel outlet 344. The liquid electrolyte 330 contains a fuel and flows in the fuel channel 340. The cathode 320 includes a gas diffusion electrode (GDE), and has first and second surfaces. The first surface of cathode 320 is in contact with an oxidant channel 350, including an oxidant inlet 352 and optional oxidant outlet 354, and the second surface of cathode 320 is in contact with electrolyte 360. Preferably the oxidant pressure in the oxidant channel 350 is no greater than 0.14 MPa, more preferably is no greater than 0.10 MPa, and more preferably is no greater than 0.07 MPa.

Figure 4:
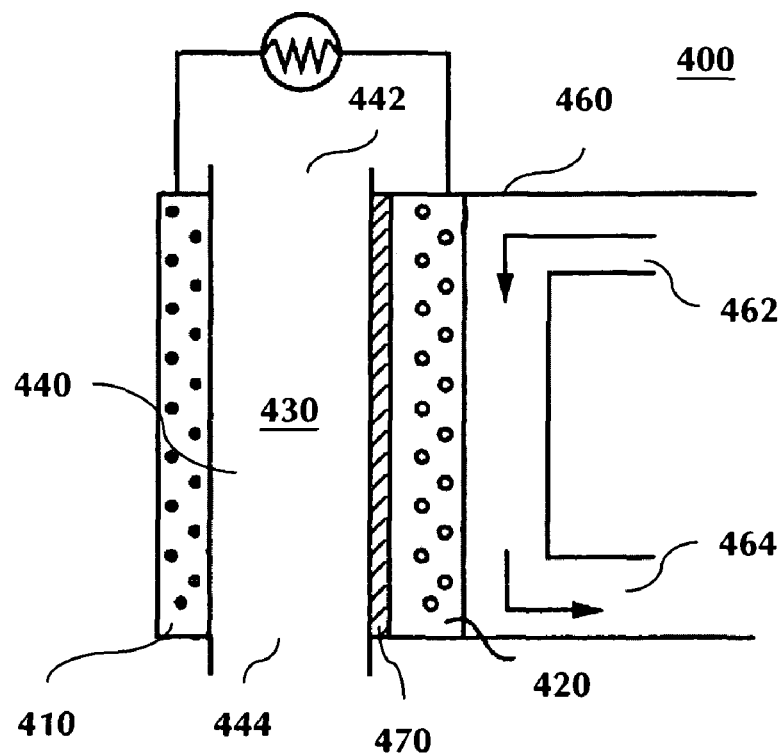
FIG. 4 is a schematic representation of an electrochemical cell including a liquid electrolyte containing a fuel.

FIG. 4 represents an example of an electrochemical cell 400 that includes an anode 410, a cathode 420 including a GDE and a blocking layer 470, and a liquid electrolyte 430 containing a fuel. The liquid electrolyte 430 is in a channel 440 having an electrolyte inlet 442 and an electrolyte outlet 444. The channel 440 is contiguous with the anode 410 and the cathode 420. The cathode 420 has first and second surfaces, and the first surface is in contact with an oxidant channel 460, including an oxidant inlet 462 and optional oxidant outlet 464. The second surface of cathode 420 is in contact with the channel 440. Preferably the blocking layer 470 at the second surface of the cathode is impermeable to the fuel and to the bulk flow of the electrolyte, while providing for permeation of water and protons.

Figure 5:
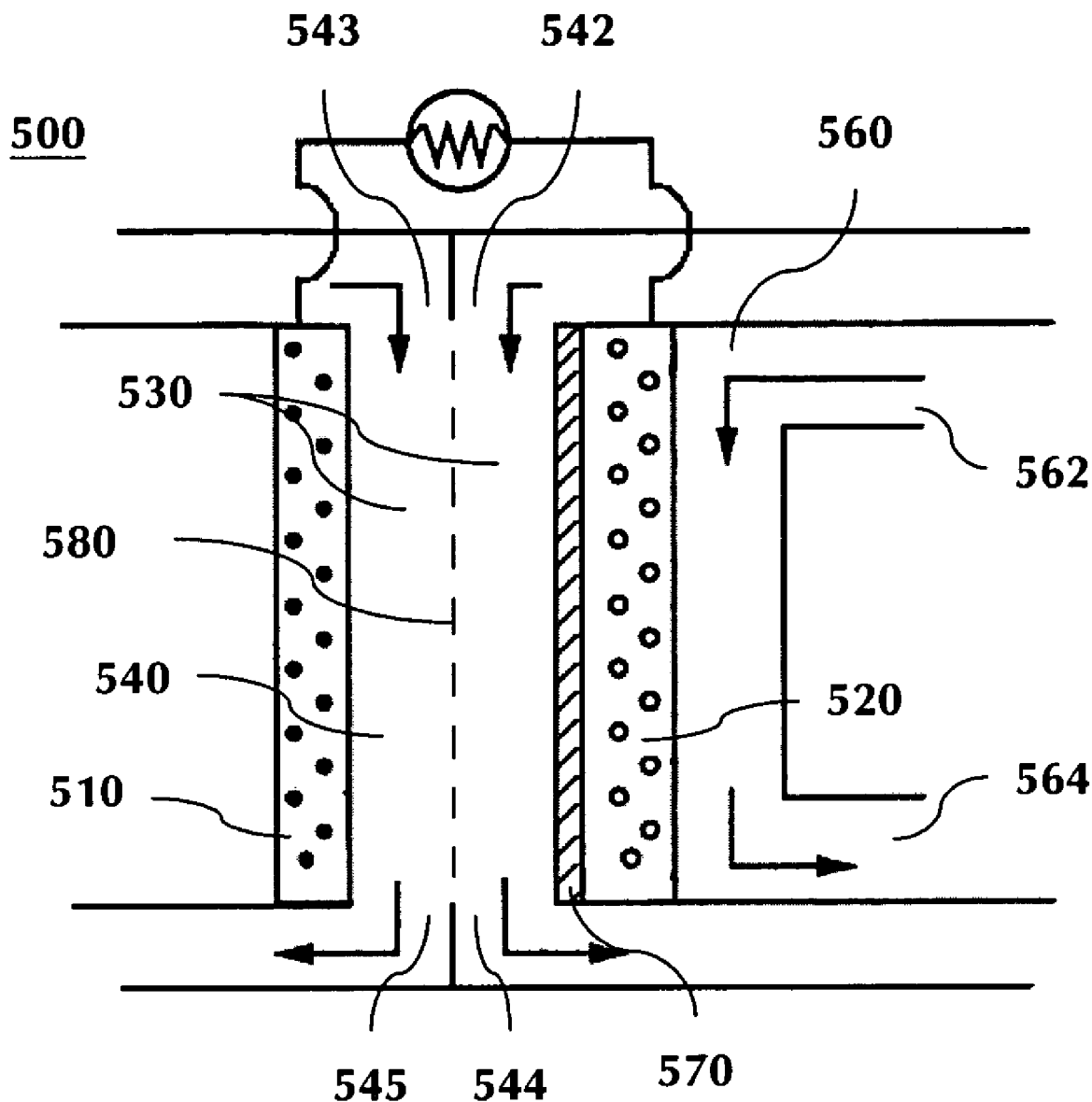
FIG. 5 is a schematic representation of an electrochemical cell including a liquid electrolyte in two streams.

FIG. 5 represents an example of an electrochemical cell 500 that includes an anode 510, a cathode 520 including a GDE and an optional blocking layer 570, and a liquid electrolyte 530. The liquid electrolyte 530 is in a channel 540 having a first electrolyte inlet 542, a second electrolyte inlet 543, a first electrolyte outlet 544 and a second electrolyte outlet 545. The channel 540 is contiguous with the anode 510 and the cathode 520. The cathode 520 has first and second surfaces, and the first surface is in contact with an oxidant channel 560, including an oxidant inlet 562 and optional oxidant outlet 564. The second surface of cathode 520 is in contact with the channel 540. The electrochemical cell during operation optionally may be characterized by an induced dynamic conducting interface 580.

When electrochemical cell 500 is operating, the liquid electrolyte 530 includes two streams. The first stream flows in the channel 540 between the first inlet 542 and the first outlet 544 and is in contact with the cathode 520. The second stream flows in the channel 540 between the second inlet 543 and the second outlet 545 and is in contact with the anode 510. When entering through the first inlet 542, the first stream does not contain a fuel. When entering through the second inlet 543, the second stream contains a mixture of an electrolyte and a fuel. The composition of the first stream and of the electrolyte portion of the second stream may be the same, or they may be different. Once the first and second streams have exited the cell through the first outlet 544 and the second outlet 545, respectively, each stream independently may be recirculated back to the appropriate inlet. Each stream also independently may be treated to remove any reaction products present in the stream after exiting through the outlet.

The first and second streams may flow through the channel by laminar flow. A laminar flow fuel cell (LFFC) uses the laminar flow properties of liquid streams to limit the mixing or crossover between two streams and to create a dynamic conducting interface, which may replace the stationary PEM or salt bridge of conventional electrochemical cells. This interface is referred to as an "induced dynamic conducting interface" (IDCI). The IDCI can maintain concentration gradients over considerable flow distances and residence times, depending on the dissolved species and the dimensions of the flow channel. LFFC systems are described, for example, in U.S. Pat. No. 6,713,206 to Markoski et al., which is incorporated by reference.

In an example of electrochemical cell 500, a first liquid electrolyte may be introduced into the channel 540 through first inlet 542, and a second liquid electrolyte may be introduced into the channel 540 through second inlet 543. The first liquid electrolyte may optionally include an oxidant. The second liquid electrolyte includes a fuel. By pumping the two solutions into the channel 540, parallel laminar flow induces a dynamic proton conducting interface 580 that is maintained during fluid flow. If the flow rates of the two fluids are kept constant, the IDCI is established directly between anode 510 and cathode 520, completing the electric circuit while keeping the streams from convectively mixing and while keeping the fuel from contacting the cathode. The two flow rates can be varied to locate the laminar flow boundary closer to the anode 510 or to the cathode 520 if desired.

One possible disadvantage of LFFCs is the need to keep the cells physically stable. Tilting or jolting of an LFFC may flip or twist the liquid streams, causing the fuel and oxidant to come in contact with the wrong electrode and leading to crossover, catastrophic failure, and/or cell reversal until the stable fluid flow can be restored. This disadvantage may be reduced or eliminated with the presence of a porous separator between the streams, as described in U.S. patent application Ser. No. 11/228,453, filed Sep. 15, 2005, entitled "Electrochemical Cells", with inventors Larry J. Markoski, Dilip Natarjan and Alex Primak, which is incorporated by reference.

Figure 6:
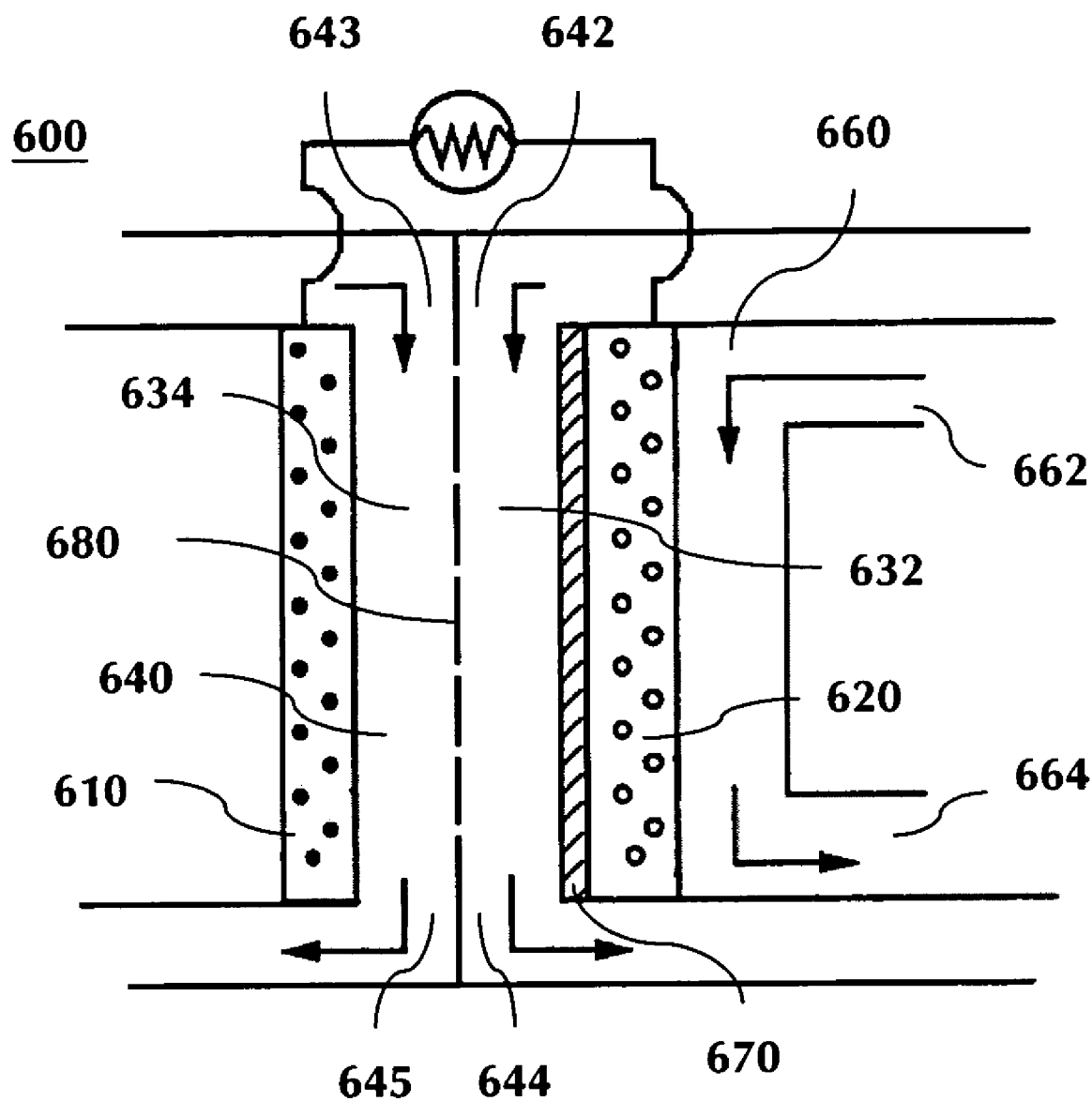
FIG. 6 is a schematic representation of an electrochemical cell including a liquid electrolyte and a porous separator.

FIG. 6 represents an example of an electrochemical cell 600 that includes an anode 610, a cathode 620 including a GDE and an optional blocking layer 670, a porous separator 680, and a liquid electrolyte having a first liquid stream 632 and a second liquid stream 634 on either side of the porous separator 680. The liquid electrolyte is in a channel 640 having a first electrolyte inlet 642, a second electrolyte inlet 643, a first electrolyte outlet 644 and a second electrolyte outlet 645. The channel 640 is contiguous with the anode 610 and the cathode 620. The cathode 620 has first and second surfaces, and the first surface is in contact with an oxidant channel 660, including an oxidant inlet 662 and optional oxidant outlet 664.

The porous separator 680 separates different streams, allowing them to be directed in different directions, and is particularly useful for keeping oxidant, fuel, and/or electrolyte streams separate for subsequent recycling. Thus, the flow boundaries of the streams are not dependent on the flow rate of the fluids. The porous separator achieves this goal without interfering significantly with ion transport between the streams. The porous separator is hydrophilic, so the fluid within the streams is drawn into the pores by capillary action. The two streams of fluid on either side of the separator are thus in direct contact, allowing ion transport between the two streams. When the pores are small and the total area of the pores is a small percentage of the total area of the porous separator, mass transfer of fluid from one stream to the other is very small, even if there is a significant difference in pressure between the streams and across the separator. This lack of mass transfer may reduce fuel crossover beyond the already low fuel crossover of LFFCs. Finally, gas cannot easily pass through the porous separator, since a large overpressure of gas is necessary to displace fluid from the pores, and therefore carbon dioxide bubbles generated within the anode stream do not end up in the electrolyte stream.

Preferably, the porous separator 680 has a thickness of 0.5 to 1000 micrometers (microns), more preferably 1 to 100 microns, and most preferably 6 to 25 microns. The average diameter of the pores (pore size) of the porous separator is preferably 1 nanometer (nm) to 100 microns, more preferably 5 nm to 5 microns, and most preferably 10 to 100 nm. The diameter of any individual pore is the diameter of a circle having the same area as the pore, as directly observed under a microscope. Preferably, the pore density is $10^4$ to $10^{12}$ pores/$cm^2$, more preferably $10^6$ to $10^{11}$ pores/$cm^2$, and most preferably $10^7$ to $10^{10}$ pores/$cm^2$. Pore density may be determined by counting the number of pores in a sample portion of the porous separator, as directly observed under a microscope. Porosity, which is the surface area of all the pores divided by the total surface area of the porous separator, is preferably 0.01 to 70%, more preferably 0.1 to 50%, and most preferably 1 to 25%. The porosity may be determined from the average pore diameter, the pore density, and the area of the porous separator:

porosity=π(density)(average diameter)/(area of separator).

The porous separator 680 may be made of any material, preferably a material which is inert to the fluids with which it will come into contact during operation of the electrochemical cell. Examples of porous separator materials include metals; ceramics; semiconductors including silicon; organic materials including polymers, plastics, and natural materials; and combinations and composites of these. Polymers, plastics and combinations are particularly preferred. Especially preferred are commercially available track etched filters, which are polymer films that have been bombarded with ions, and then chemically etched to form through-pores along the track traveled by the ions. A summary of the physical properties of commercially available polycarbonate track etch materials is listed in the table below.

| pore size (um) | pore density (pores/cm$^2$) | thickness (um) | weight (mg/cm$^2$) | minimum water bubble point (psi) | typical water flow rate (ml/min/cm$^2$)[A] |
|---|---|---|---|---|---|
| 2 | $2 \times 10^6$ | 10 | 1.0 | 0.55 | 350 |
| 1 | $2 \times 10^7$ | 11 | 1.0 | 0.76 | 250 |
| 0.8 | $3 \times 10^7$ | 9 | 1.0 | 15 | 215 |
| 0.4 | $1 \times 10^8$ | 10 | 1.0 | 36 | 70 |
| 0.2 | $3 \times 10^8$ | 10 | 1.0 | 70 | 20 |
| 0.1 | $3 \times 10^8$ | 6 | 0.6 | 95 | 4 |
| 0.08 | $6 \times 10^8$ | 6 | 0.6 | >100 | 2 |
| 0.05 | $6 \times 10^8$ | 6 | 0.6 | >100 | 0.7 |
| 0.03 | $6 \times 10^8$ | 6 | 0.6 | >100 | 0.15 |
| 0.015 | $6 \times 10^8$ | 6 | 0.6 | >100 | <0.1 |

[A]10 psi pressure drop

Fuel cells including a liquid electrolyte as described preferably produce at least 50 milliamps per square centimeter (mA/cm$^2$), more preferably at least 400 mA/cm$^2$, even more preferably at least 1000 mA/cm$^2$, including 100-1000 mA/cm$^2$, 200-800 mA/cm$^2$, and 400-600 mA/cm$^2$. These fuel cells may operate at voltages of from 1.0 to 0.1 volts (V). Preferably these fuel cells may operate at voltages of from 0.7 to 0.2 V, and more preferably from 0.5 to 0.25 V. These fuel cells may utilize parallel, multi-pass serpentine, or other flow field designs at the cathode, which may be preferred due to the lower pressure drops and lower operating stoichiometries relative to simple serpentine designs.

The current density at which cathode flooding occurs can be measured by the polarization flooding test, which is performed as follows. A fuel cell is connected to a fuel source and a gaseous oxidant source, and electrically connected to a load. The current density is increased, and the potential is measured under two different oxidant flow regimes. In the stoichiometric flow regime, the oxidant gas flow rate is varied based on the electrical current output of the fuel cell so as to maintain the oxygen concentration at 1-3 times the stoichiometric level for the fuel cell reaction. In the elevated flow regime, the oxidant gas flow rate is set so as to maintain the oxygen concentration at over 5 times the stoichiometric level. No back pressure is applied to the oxidant stream in either regime, and the temperature is maintained at 25° C. The current density at which the measured potential for the stoichiometric flow regime is 10% less than the measured potential for the elevated flow regime for a given oxidant is taken as the onset of cathode flooding.

Fuel cells including a liquid electrolyte as described preferably produce a current density of 200 mA/cm$^2$ without cathode flooding, as measured by the polarization flooding test. Preferably these fuel cells produce a current density of 300 mA/cm$^2$ without cathode flooding, more preferably of 400 mA/cm$^2$ without cathode flooding, and more preferably of 500 mA/cm$^2$ without cathode flooding, where cathode flooding is measured by the polarization flooding test. Preferably these fuel cells operate in the absence of cathode flooding without external water management components. Examples of external water management components that may be used with conventional fuel cells include condensers and evaporators.

An individual fuel cell may be incorporated into a module or component, together with support components, to provide a power supply. As a result, it may be useful to provide a power supply implementation using such fuel cells. Examples of support components include fuel and electrolytes, a pump, a blower, a mixing chamber, a reservoir, a valve, a vent, a power converter, a power regulator, a battery power supply and various control components. An active power system including this electrochemical cell technology may include a fuel cell stack, which may be a stack of individual fuel cells such as fuel cells including a liquid electrolyte as described.

This technology may be especially useful in portable and mobile fuel cell systems and other electronic devices, such as in cellular phones, laptop computers, DVD players, televisions, personal data assistants (PDAs), calculators, pagers, hand-held video games, remote controls, cassette players, CD players, radios, audio recorders, video recorders, cameras, navigation systems, and wristwatches. This technology also may be useful in automotive and aviation systems, including systems used in aerospace vehicles.

The following examples are provided to illustrate one or more preferred embodiments of the invention. Numerous variations may be made to the following examples that lie within the scope of the invention.

EXAMPLES

Example 1

Multi-Channel LFFC with Internally Replenishable Oxidant

An externally manifold 1×5 LFFC array was fabricated. A catalyzed graphite sheet (1 mm) was the anode. A 50 micrometer Kapton layer provided the channel height for the anode. A 50 micrometer Kapton layer provided the channel height for the electrolyte. The porous layer separating the anode from the electrolyte was composed of a 6 micrometer thick polycarbonate track etched layer with 100 nm pores and $6\times10^8$ pores/cm$^2$. This equates to approximately 2-4% porosity. Liquid channel dimensions were 1.5 mm width, 50 micron height, and 30 mm length. The electrode to electrode distance was 130 um. The cathode was composed of a 25 micron NAFION 111 bonded to a pre-catalyzed 250 micron GDE with the gas porous side exposed to 0.5 mm graphite gas flow channels and the NAFION side exposed to the electrolyte. The anode was 5 mg/cm$^2$ 50/50 Pt/Ru black deposited onto a graphite plate, and the cathode was 2 mg/cm$^2$ 50% Pt/C and 4 mg/cm$^2$ Pt black deposited onto a GDE. If all of the Kapton layers, track etch layer, GDE, and current collectors were very flat and aligned, no external leak points were observed while held under an external compression field (100-500 lbs). Near even fluid distribution between the channels was also observed with these un-bonded layers.

Figure 7:
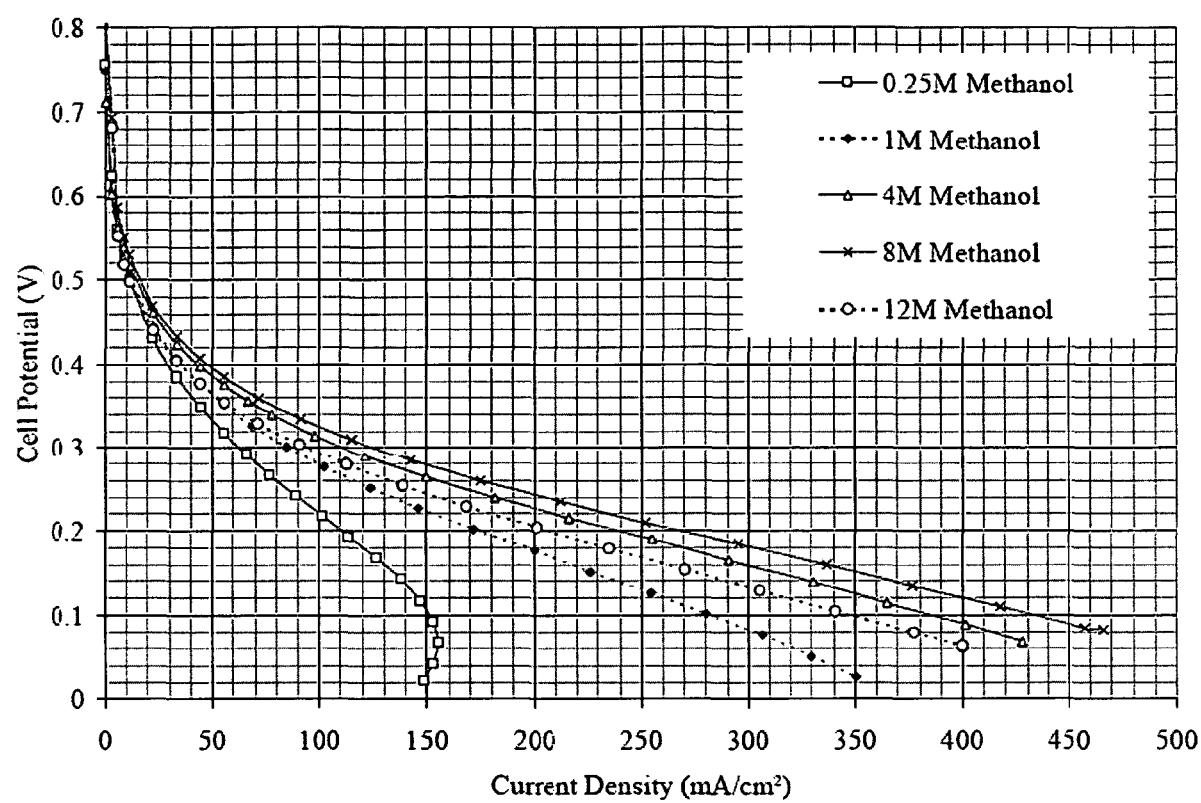
FIG. 7 is a graph of polarization curves for a laminar flow fuel cell (LFFC) operated at room temperature at different fuel concentrations.

FIG. 7 illustrates the room temperature performance improvements that occurred as a result of increasing fuel concentration of methanol in 1.0 M sulfuric acid for the fuel stream (4 mL/min total), 1.0 M sulfuric acid for the electrolyte stream (4 mL/min total), and ambient oxygen (1000 mL/min total). High current densities were still achieved with multiple channels in parallel and CO$_2$ bubble formation could be observed only in the fuel effluent around and above 150 mA/cm$^2$. The presence of bubbles in the fuel effluent did not reduce cell performance. The absence of bubbles in the electrolyte and the absence of significant liquid in the gas effluent indicated little to no internal mixing of the fuel, electrolyte and oxidant streams which were completely separated upon exiting the cell. A slight performance decrease was observed with 12 M MeOH which was determined to be a result of increased cell resistance and not fuel cross-over under these conditions.

Figure 8:
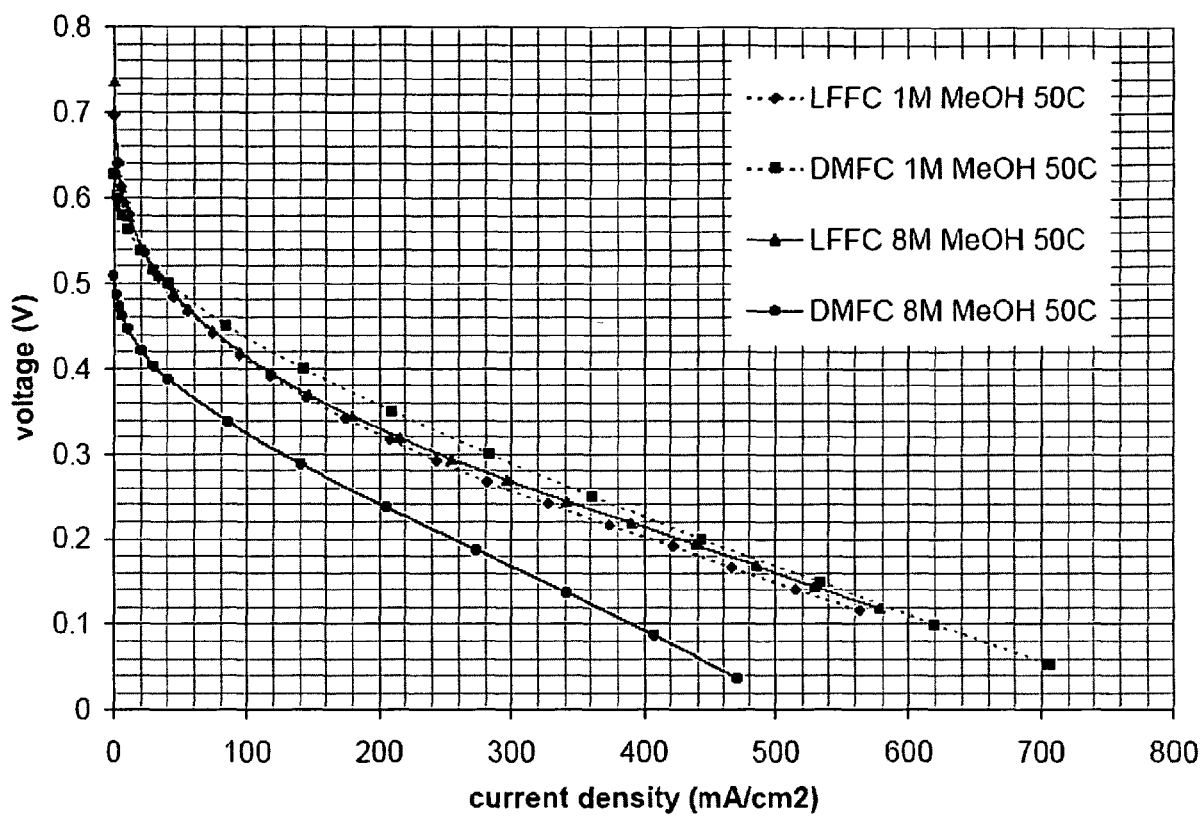
FIG. 8 is a graph comparing performance of a commercially available DMFC and a 1×5 LFFC array, both operated at 50° C.

Elevated temperature effects on the externally manifold 1×5 LFFC described above were investigated, and a comparison to a commercially available DMFC (5 cm$^2$ with NAFION 117 membrane electrode assembly) under identical operating and temperature conditions was made. The DMFC did not have any sulfuric acid in the fuel stream. By raising the temperature of the LFFC to 50° C., and keeping 1M MeOH as fuel, an overall increase in performance was observed as expected (see FIG. 8). However, when 8M MeOH was used again as fuel the improvements were smaller suggesting that at elevated temperatures transport issues to the anode are less of an issue and that the cathode is most likely limiting the LFFC under these conditions. The commercially available DMFC exhibited slightly better performance than the LFFC when both were operated with 1 M MeOH. However, when the DMFC was exposed to 8 M MeOH the performance was negatively impacted as a result of crossover. Thus, the LFFC design had a lower cell resistance and/or better mass transport characteristics than a traditional DMFC. In addition, the LFFC design had a much lower crossover rate.

Example 2

Membrane-Electrode Assembly Fuel Cell Having Electrolyte/Fuel Mixture

A fuel cell containing a membrane electrode assembly (MEA) was assembled from a commercial 25 cm$^2$ DMFC single test cell. The cell included standard serpentine flow fields from Fuel Cell Technologies (Albuquerque, N. Mex.) and a 25 cm$^2$ MEA from Lynntech (College Station, Tex.). The MEA included two carbon cloth gas diffusion layers and a pre-catalyzed Nafion 117 having an overall thickness greater than 200 micrometers. The cathode was loaded with 4 mg/cm$^2$ Pt black, and the anode was loaded with 4.0 mg/cm$^2$ Pt—Ru.

After assembly by compression, the performance of the fuel cell was measured for various fuel compositions and at two different oxidant flow rate regimes. The aqueous fuel stream to the anode was a mixture of formic acid and sulfuric acid. Constant fuel concentrations of 1 M formic acid were prepared in 0.188 M (1% v/v), 1.88 M (10% v/v) and 3.76 M (20% v/v) solutions of sulfuric acid respectively and pumped through the cell with a Micropump (Cole-Parmer Scientific, Chicago Ill.) at a constant rate of 70 mL/min.

The oxidant stream to the cathode was oxygen gas. In the "stoichiometric oxygen flow" regime, the flow rate was varied based on the electrical current output of the fuel cell. The oxygen flow rate was 50 mL/min+10.5 mL/min/Amp, where the 10.5 (mL/min)/Amp maintains the oxygen concentration at 3 times the stoichiometric level for the fuel cell reaction. Thus, the stoichiometric oxygen flow regime used an oxidant flow rate of 3 stoich. In the "elevated oxygen flow" regime, the flow rate was a constant 600 ml/min. No back pressure was applied to the gas stream.

Figure 9:
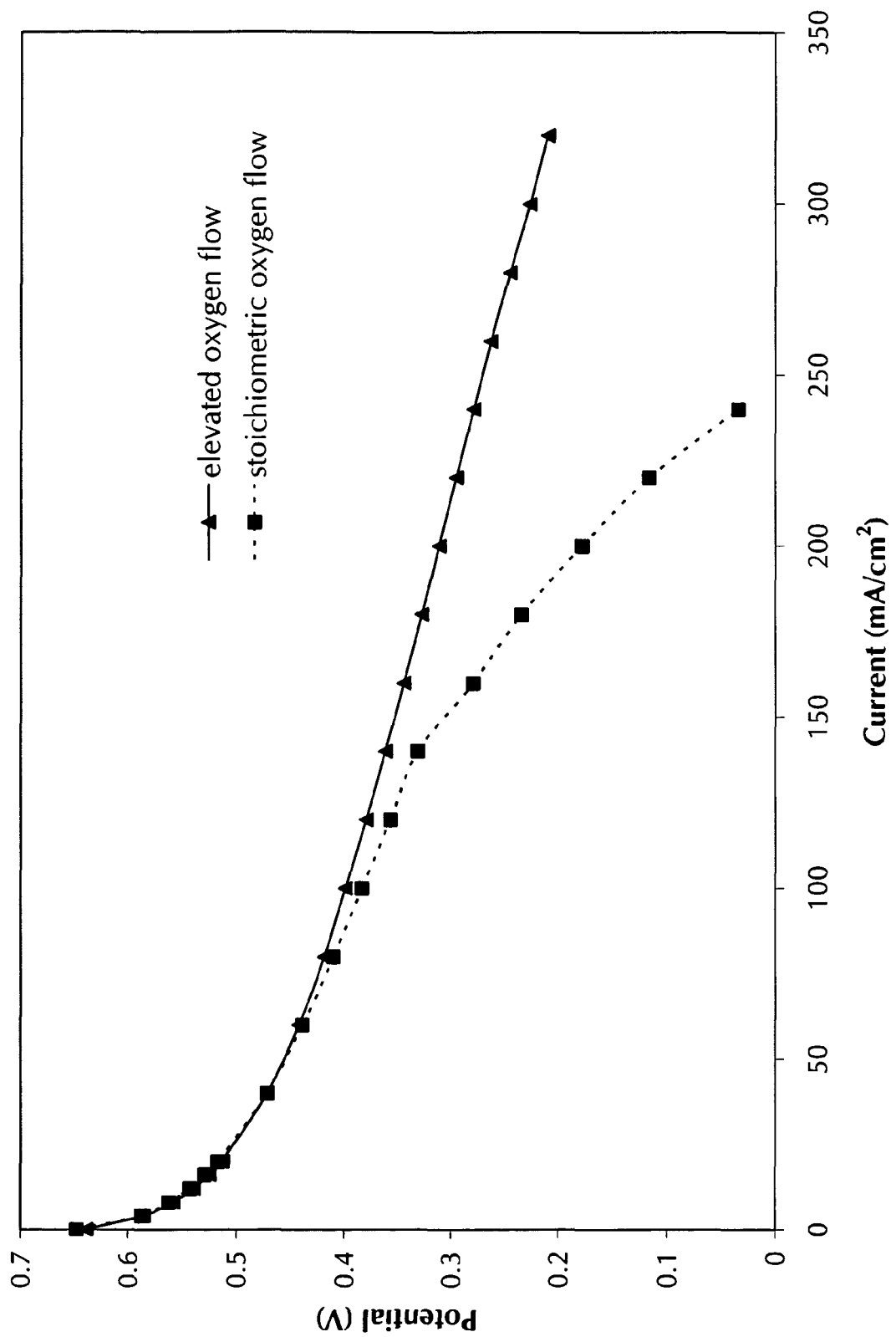
FIG. 9 is a graph of potential as a function of current for a membrane electrode assembly (MEA) fuel cell including a liquid electrolyte containing a fuel.
Figure 10:
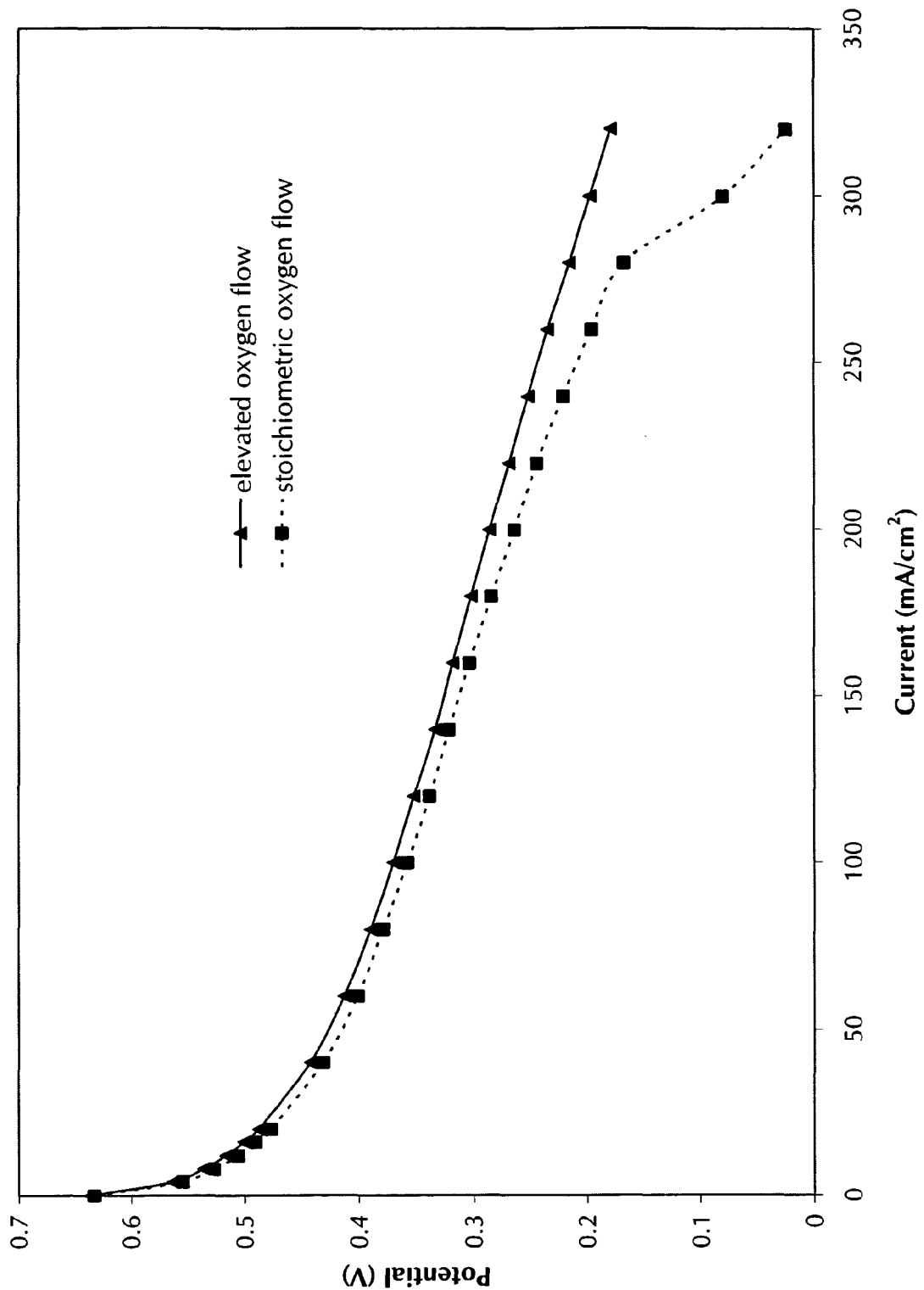
FIG. 10 is a graph of potential as a function of current for a MEA fuel cell including a liquid electrolyte containing a fuel.
Figure 11:
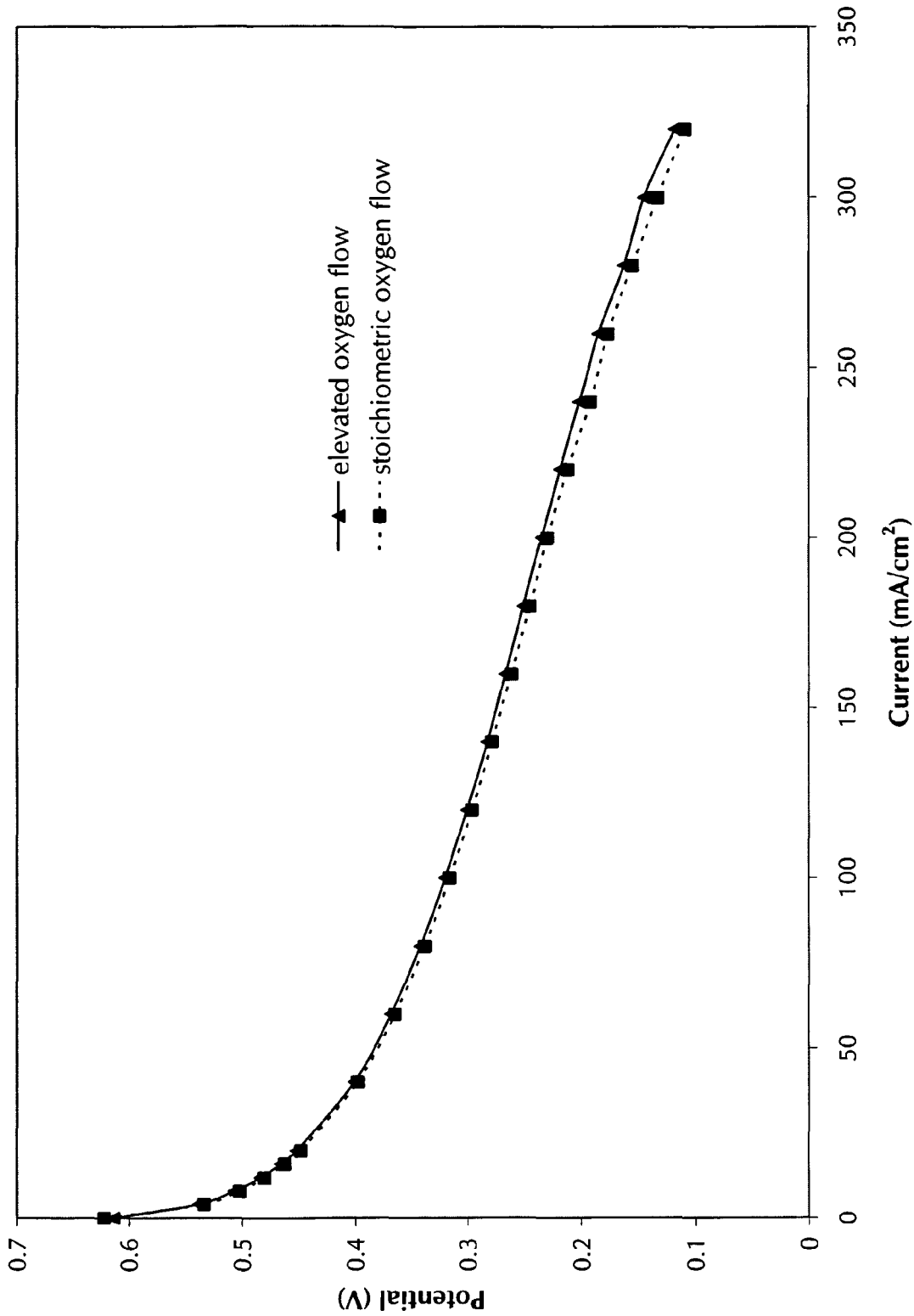
FIG. 11 is a graph of potential as a function of current for a MEA fuel cell including a liquid electrolyte containing a fuel.

FIG. 9 is a graph of potential as a function of current for the fuel cell when the fuel mixture was 1M formic acid and 1 vol % sulfuric acid. Under stoichiometric oxygen flow, the fuel cell showed the effects of cathode flooding at currents greater than 140 A/cm$^2$. FIG. 10 is a graph of potential as a function of current for the fuel cell when the fuel mixture was 1M formic acid and 10 vol % sulfuric acid. Under stoichiometric oxygen flow, the fuel cell showed the effects of cathode flooding at currents greater than 280 A/cm$^2$. The effects of flooding were not observed for either fuel mixture during elevated oxygen flow. FIG. 11 is a graph of potential as a function of current for the fuel cell when the fuel mixture was 1M formic acid and 20 vol % sulfuric acid. No effects of flooding were observed either for stoichiometric oxygen flow or for elevated oxygen flow.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A method of generating electricity from an electrochemical cell, the electrochemical cell comprising:
   an anode;
   a cathode, comprising a gas diffusion electrode and comprising first and second surfaces;
   an inlet for gaseous oxidant, in contact with the first surface of the cathode;
   a channel that is contiguous with the anode and with the second surface of the cathode; and
   a liquid electrolyte in the channel;
   wherein water generated at the cathode is transported by osmosis into the liquid electrolyte;
   the method comprising:
   flowing a gaseous oxidant through the inlet in contact with the first surface of the cathode;
   flowing the liquid electrolyte through the channel; and
   contacting the anode with a fuel;
   wherein complementary half cell reactions take place at the cathode and anode, and the liquid electrolyte has an osmotic pressure of at least 1.2 MPa.

2. A method of generating electricity from an electrochemical cell, the electrochemical cell comprising:
an anode;
a cathode, comprising a gas diffusion electrode and comprising first and second surfaces;
an inlet for gaseous oxidant, in contact with the first surface of the cathode;
a channel that is contiguous with the anode and with the second surface of the cathode; and
a liquid electrolyte in the channel;
wherein water generated at the cathode is transported by osmosis into the liquid electrolyte;
the method comprising:
flowing a gaseous oxidant through the inlet in contact with the first surface of the cathode;
flowing the liquid electrolyte through the channel; and
contacting the anode with a fuel;
wherein complementary half cell reactions take place at the cathode and anode, and
the liquid electrolyte has an osmotic pressure of at least 10 MPa.

3. A method of generating electricity from an electrochemical cell, the electrochemical cell comprising:
an anode;
a cathode, comprising a gas diffusion electrode and comprising first and second surfaces;
an inlet for gaseous oxidant, in contact with the first surface of the cathode;
a channel that is contiguous with the anode and with the second surface of the cathode; and
a liquid electrolyte in the channel;
wherein water generated at the cathode is transported by osmosis into the liquid electrolyte;
the method comprising:
flowing a gaseous oxidant through the inlet in contact with the first surface of the cathode;
flowing the liquid electrolyte through the channel; and
contacting the anode with a fuel;
wherein complementary half cell reactions take place at the cathode and anode, and
the osmotic pressure between the liquid electrolyte and the water generated at the cathode is at least 1.0 MPa.

4. The method of claim 1, wherein the electrochemical cell can produce a current density of 200 mA/cm$^2$ without cathode flooding.

5. The method of claim 1, wherein the electrochemical cell can produce a current density of 300 mA/cm$^2$ without cathode flooding.

6. The method of claim 1, wherein the electrochemical cell can produce a current density of 400 mA/cm$^2$ without cathode flooding.

7. The method of claim 1, wherein the electrochemical cell can produce a current density of 500 mA/cm$^2$ without cathode flooding.

8. The method of claim 1, wherein the liquid electrolyte is transported in the channel at a rate of at least 0.1 mL/sec.

9. The method of claim 1, wherein the cathode comprises a blocking layer at the second surface.

10. The method of claim 9, wherein the blocking layer comprises a catalyst.

11. The method of claim 9, wherein the blocking layer comprises a membrane.

12. The method of claim 9, wherein the blocking layer comprises a polymer electrolyte membrane.

13. The method of claim 1, wherein the channel comprises a first inlet, a second inlet, a first outlet and a second outlet, and
the liquid electrolyte comprises a first stream and a second stream,
the first stream in contact with the cathode and flowing from the first inlet to the first outlet, and
a second stream in contact with the anode and flowing from the second inlet to the second outlet.

14. The method of claim 13, further comprising a porous separator between the first and second streams.

15. The method of claim 13, wherein the first stream and second stream flow in the channel with laminar flow.

16. The method of claim 1, wherein the anode comprises first and second surfaces, the channel in contact with the first surface of the anode, and
the electrochemical cell further comprises an inlet for fuel, in contact with the second surface of the anode.

17. The method of claim 16, wherein the fuel comprises a liquid electrolyte.

18. The method of claim 1, wherein the electrochemical cell is a fuel cell.

19. The method of claim 18, wherein the fuel cell is a methanol fuel cell.

20. The method of claim 1, wherein the pressure of the gaseous oxidant is no greater than 0.10 MPa.

* * * * *